United States Patent
Koizumi

(10) Patent No.: US 10,853,980 B2
(45) Date of Patent: Dec. 1, 2020

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Isao Koizumi, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/232,399

(22) Filed: Dec. 26, 2018

(65) Prior Publication Data

US 2019/0130627 A1    May 2, 2019

Related U.S. Application Data

(63) Continuation of application No. PCT/JP2017/020080, filed on May 30, 2017.

(30) Foreign Application Priority Data

Jul. 4, 2016    (JP) ................ 2016-132371

(51) Int. Cl.
   *G09G 5/00*    (2006.01)
   *G06T 11/60*    (2006.01)
   (Continued)

(52) U.S. Cl.
   CPC ........... *G06T 11/60* (2013.01); *G06T 3/40* (2013.01); *G06T 7/0002* (2013.01);
   (Continued)

(58) Field of Classification Search
   CPC ........... G09G 5/14; G09G 2340/10; G09G 2340/125; G06T 11/60; G06T 15/503
   (Continued)

(56) References Cited

U.S. PATENT DOCUMENTS

| 9,665,959 B2 | 5/2017 | Hatano et al. |
| 2008/0077658 A1 | 3/2008 | Kojima |

(Continued)

FOREIGN PATENT DOCUMENTS

| JP | 2001-297051 A | 10/2001 |
| JP | 2007304970 A | 11/2007 |

(Continued)

OTHER PUBLICATIONS

International Search Report issued in PCT/JP2017/020080; dated Jul. 18, 2017.

(Continued)

*Primary Examiner* — Gordon G Liu
(74) *Attorney, Agent, or Firm* — Studebaker & Brackett PC

(57) ABSTRACT

In the image processing apparatus, the image processing method, the program, and the recording medium of the present invention, an image arrangement section arranges compositing target images according to a first layout to create a composite image. In a case where a comment combination region presence determination section determines that there is no region where comments are to be combined within the arrangement region of the compositing target images in the composite image, a composite image layout change section changes the first layout to a second layout in which the compositing target images and the comments are combined. The image arrangement section arranges the compositing target images in the second layout and combines the compositing target images and the comments to recreate the composite image.

24 Claims, 25 Drawing Sheets

(51) Int. Cl.
*H04N 1/387* (2006.01)
*G06T 3/40* (2006.01)
*G06T 7/00* (2017.01)
*G06T 11/00* (2006.01)
*H04L 29/06* (2006.01)

(52) U.S. Cl.
CPC ........... *G06T 11/001* (2013.01); *H04N 1/387* (2013.01); *H04N 1/3871* (2013.01); *G06T 2207/30168* (2013.01); *G06T 2207/30201* (2013.01); *H04L 67/42* (2013.01)

(58) Field of Classification Search
USPC ......................................................... 345/629
See application file for complete search history.

(56) References Cited

U.S. PATENT DOCUMENTS

| | | | | |
|---|---|---|---|---|
| 2013/0198602 | A1* | 8/2013 | Kokemohr | G06F 40/169 715/233 |
| 2014/0193047 | A1* | 7/2014 | Grosz | G06Q 30/0241 382/118 |
| 2015/0092070 | A1* | 4/2015 | Hatano | G06T 11/60 348/211.3 |
| 2015/0189107 | A1* | 7/2015 | Murata | G06T 11/60 345/629 |
| 2016/0301813 | A1* | 10/2016 | Swire | H04N 1/00188 |

FOREIGN PATENT DOCUMENTS

| | | |
|---|---|---|
| JP | 2008083863 A | 4/2008 |
| JP | 2008-257308 A | 10/2008 |
| JP | 2010204898 A | 9/2010 |
| JP | 2013161467 A | 8/2013 |
| JP | 2015-069431 A | 4/2015 |
| JP | 2015-133000 A | 7/2015 |

OTHER PUBLICATIONS

International Preliminary Report on Patentability and Written Opinion issued in PCT/JP2017/020080; dated Jan. 8, 2019.
"Year Album Simple Creation of Photobook and Photo Album" with Concise Explanation of Relevance, [online], Mar. 1, 2016, Fujifilm, [Search on Mar. 10, 2016], the Internet <URL:http://year-album.jp/>.
"Create Photobook for Writing With Year Album That Everyone Makes! | Fujifilm" with Concise Explanation of Relevance, [online], Mar. 1, 2016, Fujifilm, [Search on Mar. 10, 2016], the Internet <URL:http://year-album.jp/minna/>.
"How to Make: Create Photobook for Writing With Year Album That Everyone Makes! | Fujifilm" with Concise Explanation of Relevance, [online], Mar. 1, 2016, Fujifilm, [Search on Mar. 10, 2016], the Internet <URL:http://yearalbum.jp/minna/login/>).

* cited by examiner

<     3. CHECK/SAVE CONTENTS

STEP3

2/3    LOG IN AND SAVE INPUT CONTENTS SO FAR.

E-MAIL ADDRESS

PASSWORD

LOGIN

NEW MEMBERSHIP REGISTRATION    PASSWORD FORGOT

FIG. 21

<     3. CHECK/SAVE CONTENTS

STEP3

3/3    LOGIN AND SAVING OF INPUT CONTENTS HAVE BEEN COMPLETED.

E-MAIL OF COMPLETION OF REGISTRATION HAS BEEN SENT TO REGISTERED E-MAIL ADDRESS OF MEMBER ***.
THIS E-MAIL INCLUDES URL FOR ACCESSING MANAGEMENT SCREEN FOR SECRETARY. IN ORDER TO START, PLEASE CLICK THIS URL.
* IN CASE WHERE YOU WANT TO SEND E-MAIL OF COMPLETION OF REGISTRATION TO E-MAIL ADDRESS OTHER THAN E-MAIL ADDRESS OF MEMBER ***:
E-MAIL ADDRESS [_____]
SEND

NEXT

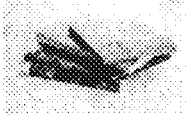

FIG. 24

| < | 4. CREATE/SEND INVITATION LETTER |
|---|---|

STEP1 STEP2 STEP3 STEP4

3/3 PLEASE SEND INVITATION LETTER AND PASSWORD TO EVERYONE BY SNS OR E-MAIL.

SEND INVITATION LETTER

| SNS | E-MAIL |

INVITATION LETTER URL http://XXXXXXX

PASSWORD

5865

NEXT

FIG. 28

REGISTER NAME

NAME

SECRET CODE

NEXT

FIG. 29

1. SUBMIT PHOTOS

STEP1 > STEP2 > STEP3 > STEP4

PLEASE SUBMIT PHOTOS YOU HAVE.

● ADD IMAGE

NUMBER OF PHOTOS: 0     NEXT

IMAGE PROCESSING APPARATUS, IMAGE PROCESSING METHOD, PROGRAM, AND RECORDING MEDIUM

CROSS REFERENCE TO RELATED APPLICATIONS

This application is a Continuation of PCT International Application No. PCT/JP2017/020080 filed on May 30, 2017, which claims priority under 35 U.S.C § 119(a) to Patent Application No. 2016-132371 filed in Japan on Jul. 4, 2016, all of which are hereby expressly incorporated by reference into the present application.

BACKGROUND OF THE INVENTION

1. Field of the Invention

The present invention relates to an image processing apparatus, an image processing method, a program, and a recording medium for creating a composite image using a plurality of images acquired from terminal devices of a plurality of users through a network.

2. Description of the Related Art

A photobook is a service to create a photo collection of a layout that a user desires using a plurality of transmitted images (image data) owned by the user in a case where the user transmits the plurality of images to the service provider through the Internet.

For example, a photobook is created by classifying a plurality of images into a plurality of groups based on the imaging time or the like in consideration of the continuity or relevance of images and automatically arranging (automatically laying out) images included in each group on corresponding pages.

In recent years, not only creating one photobook using a plurality of images owned by one user but also creating one photobook using a plurality of images owned by a plurality of users (refer to JP2008-257308A and JP2015-069431A), acquiring messages for writing from a plurality of users and creating a writing using the messages for writing acquired from the plurality of users (refer to JP2001-297051A and JP2015-133000A), and the like are known.

In practice, there is also a service of creating one photobook using a plurality of images owned by a plurality of users, messages sent by the plurality of users, and the like (refer to "Year Album Simple Creation Of Photobook And Photo Album", [online], Mar. 1, 2016, Fujifilm, [Search on Mar. 10, 2016], the Internet <URL: http://year-album.jp/>, "Create Photobook For Writing With Year Album That Everyone Makes!|Fujifilm", [online], Mar. 1, 2016, Fujifilm, [Search on Mar. 10, 2016], the Internet <URL: http://year-album.jp/minna/>, and "How To Make: Create Photobook For Writing With Year Album That Everyone Makes!|Fujifilm", [online], Mar. 1, 2016, Fujifilm, [Search on Mar. 10, 2016], the Internet <URL: http://year-album.jp/minna/login/>).

SUMMARY OF THE INVENTION

For example, JP2015-069431A discloses that images having the same event name and the same target person as a candidate image are extracted from an image group using exchangeable image file format (Exif) tag information, comments attached to each image in the case of creating an image group on the social networking service (SNS), and the like.

Although JP2015-069431A discloses that information, such as comments, is given to each image as described above, creating a composite image by combining an image and comments given to the image by a plurality of users is not disclosed in JP2015-069431A.

It is an object of the present invention to provide an image processing apparatus, an image processing method, a program, and a recording medium capable of creating a composite image by combining an image and comments given to the image by a plurality of users.

In order to achieve the aforementioned object, the present invention provides an image processing apparatus comprising: an image acquisition section that acquires a plurality of images from a plurality of users; a comment acquisition section that acquires comments, which are given to each of the plurality of images by the plurality of users, from the plurality of users; an image extraction section that extracts two or more images including one or more first images that are images to which the comments are given, among the plurality of images, as compositing target images; an image arrangement section that arranges the compositing target images according to a first layout to create a composite image; a comment combination region presence determination section that determines whether or not a region where the comments given to the first images are to be combined is present around the compositing target images in an arrangement region of the compositing target images in the composite image; and a composite image layout change section that changes the first layout to a second layout, in which the compositing target images and the comments given to the first images are combined, in a case where the comment combination region presence determination section determines that a region where the comments given to the first images are to be combined is not present around the compositing target images. The image arrangement section arranges the compositing target images in the second layout and combines the compositing target images and the comments given to the first images to recreate the composite image.

Here, it is preferable that the composite image layout change section changes the first layout to the second layout by performing at least one of (1) arranging the comments given to the first images in an arrangement region of the compositing target images in the composite image obtained by reducing the sizes of one or more images other than the first images among the compositing target images, (2) arranging the comments given to the first images in an arrangement region of the compositing target images in the composite image obtained by deleting one or more images other than the first images among the compositing target images, (3) making an arrangement region of the comments translucent and arranging one of the compositing target images and the comments given to the first images so as to be superimposed on each other, or (4) extracting a background region of one of the compositing target images and arranging the comments given to the first images in the background region of one of the compositing target images.

It is preferable to further comprise a number-of-comments calculation section that calculates the number of comments given to each of the images. It is preferable that the composite image layout change section changes the first layout to the second layout, in which at least one of the (1)

to (4) is performed, according to the number of comments given to the first images included in the compositing target images.

It is preferable to further comprise: an image analysis section that analyzes contents of each of the images; an evaluation value calculation section that calculates an analysis evaluation value of each of the images based on an analysis result of each of the images; and a number-of-comments calculation section that calculates the number of comments given to each of the images. It is preferable that the evaluation value calculation section calculates an overall evaluation value of each of the images by adding a larger value to the analysis evaluation value of each of the images as the number of comments becomes larger and that the image extraction section extracts the compositing target images among the plurality of images based on the overall evaluation value.

It is preferable to further comprise: an evaluation information acquisition section that acquires evaluation information, which indicates user's high evaluation or low evaluation for each of the images, from the plurality of users; and a number-of-evaluations calculation section that calculates the number of pieces of evaluation information, which indicates the high evaluation, given to each of the images. It is preferable that the evaluation value calculation section further calculates the overall evaluation value of each of the images by adding a larger value to the analysis evaluation value of each of the images as the number of pieces of evaluation information indicating the high evaluation becomes larger.

It is preferable that the image arrangement section emphasizes the first images so as to be more noticeable than a second image that is an image to which the comments are not given.

It is preferable that the image arrangement section increases the size of the first image so as to be larger than a size of the second image.

It is preferable that the image arrangement section arranges a frame image decorating periphery of an image only around the first image.

It is preferable that, in a case where at least one of the (1) or the (2) is performed in the second layout and a plurality of comments are given to the one first image, the image arrangement section arranges the plurality of comments given to the one first image side by side around the one first image in the arrangement region of the compositing target images in the composite image.

It is preferable that the image acquisition section further acquires a face image of each of the users from each of the users and that the image arrangement section further arranges face images of users, who have given the plurality of comments to the first images, so as to be associated with the respective comments given to the first images in the arrangement region of the compositing target images in the composite image.

It is preferable that the image arrangement section displays names of users, who have given the plurality of comments to the first images, so as to be associated with the respective comments given to the first images in the arrangement region of the compositing target images in the composite image.

It is preferable that the image arrangement section further arranges the comments given to the first images in the arrangement region of the compositing target images in the composite image obtained by reducing the sizes of the first images.

It is preferable that, in a case where at least one of the (3) or the (4) is performed in the second layout, the image arrangement section displays the comments given to the first images in a form of a balloon within an arrangement region of the first images.

It is preferable that the comment acquisition section further acquires additional comments, which are given to the comments given to the first images, from the plurality of users and that, in a case where at least one of the (1) or the (2) is performed in the second layout, the image arrangement section arranges the comments given to the first images and the additional comments side by side around the first images in the arrangement region of the compositing target images in the composite image.

It is preferable to further comprise a comment request section that requests the plurality of users to send comments on a third image, which is an image designated by at least one first user of the plurality of users, among the plurality of images. It is preferable that the comment acquisition section further acquires comments given to the third image.

It is preferable that the image arrangement section changes a color of characters included in the comments given to the first images or a color of a boundary of the characters based on an analysis result of each of the first images.

It is preferable that the image arrangement section changes the characters included in the comments given to the first images in a three-dimensional manner.

It is preferable to further comprise a comment selection section that selects a smaller number of comments than a plurality of comments given to the one first image, among the plurality of comments given to the one first image, as selected comments in a case where the plurality of comments are given to the one first image. It is preferable that the image arrangement section arranges the compositing target images and combines the compositing target images and the selected comments to create the composite image.

In addition, the present invention provides an image processing method comprising: a step in which an image acquisition section acquires a plurality of images from a plurality of users; a step in which a comment acquisition section acquires comments, which are given to each of the plurality of images by the plurality of users, from the plurality of users; a step in which an image extraction section extracts two or more images including one or more first images that are images to which the comments are given, among the plurality of images, as compositing target images; a step in which an image arrangement section arranges the compositing target images according to a first layout to create a composite image; a step in which a comment combination region presence determination section determines whether or not a region where the comments given to the first images are to be combined is present around the compositing target images in an arrangement region of the compositing target images in the composite image; a step in which a composite image layout change section changes the first layout to a second layout, in which the compositing target images and the comments given to the first images are combined, in a case where it is determined that a region where the comments given to the first images are to be combined is not present around the compositing target images in the step of determining whether or not a region where the comments are to be combined is present; and a step in which the image arrangement section arranges the compositing target images in the second layout and combines the compositing target images and the comments given to the first images to recreate the composite image.

Here, it is preferable that, in the step of changing the first layout to the second layout, the first layout is changed to the second layout by performing at least one of (1) arranging the comments given to the first images in an arrangement region of the compositing target images in the composite image obtained by reducing the sizes of one or more images other than the first images among the compositing target images, (2) arranging the comments given to the first images in an arrangement region of the compositing target images in the composite image obtained by deleting one or more images other than the first images among the compositing target images, (3) making an arrangement region of the comments translucent and arranging one of the compositing target images and the comments given to the first images so as to be superimposed on each other, or (4) extracting a background region of one of the compositing target images and arranging the comments given to the first images in the background region of one of the compositing target images.

In addition, the present invention provides a program causing a computer to execute each step of the image processing method described above.

In addition, the present invention provides a computer-readable recording medium in which a program causing a computer to execute each step of the image processing method described above is recorded.

According to the present invention, it is possible to create a composite image by acquiring a plurality of images from a plurality of users, acquiring comments given to each of the plurality of images by the plurality of users, and combining compositing target images with comments given to the first image by the plurality of users. In addition, according to the present invention, it is possible to arrange a larger number of comments in the arrangement region of the compositing target images in the composite image without losing the value of the first image in the composite image.

BRIEF DESCRIPTION OF THE DRAWINGS

FIG. 18 is a conceptual diagram of an example showing a screen for setting the image product delivery date.

FIG. 20 is a conceptual diagram of an example showing a screen for inputting account information.

FIG. 21 is a conceptual diagram of an example showing a screen showing that the login of a secretary user and the storage of information of image product items and the schedule have been completed.

FIG. 22 is a conceptual diagram of an example showing a screen for creating an invitation letter to be sent to the terminal device of the participating user.

FIG. 23 is a conceptual diagram of an example showing a screen for checking the contents of the invitation letter.

FIG. 24 is a conceptual diagram of an example showing a screen for sending an invitation letter to the terminal device of the participating user.

FIG. 26 is a conceptual diagram of an example showing a screen for inputting a common password for accessing a screen onto which participating users uploads images used in a composite image, evaluation information of images, messages for writing, and the like.

FIG. 28 is a conceptual diagram of an example showing a screen for registering a name registered as a participating user and a secret code.

FIG. 29 is a conceptual diagram of an example showing a screen for a participating user to select an image to be uploaded.

DESCRIPTION OF THE PREFERRED EMBODIMENTS

Hereinafter, an image processing apparatus, an image processing method, a program, and a recording medium according to the embodiment of the present invention will be described in detail based on a preferred embodiment shown in the accompanying diagrams.

Figure 1:
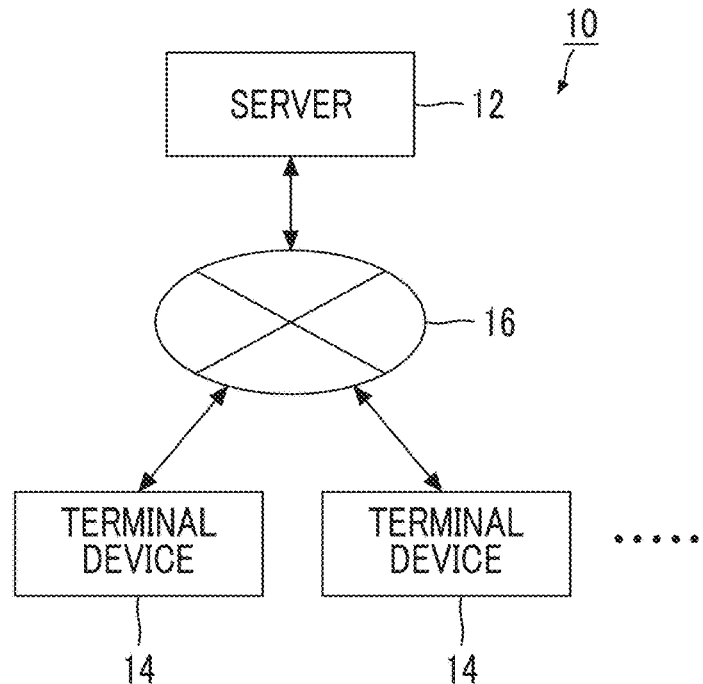
FIG. 1 is a block diagram of an embodiment showing the configuration of an image processing apparatus according to the present invention.

FIG. 1 is a block diagram of an embodiment showing the configuration of the image processing apparatus according to the present invention. An image processing apparatus 10 shown in FIG. 1 creates a composite image, such as a photobook including a writing page, using a plurality of images acquired from terminal devices of a plurality of users involved in the creation of a composite image through a network 16. The image processing apparatus 10 comprises a server 12 and terminal devices (clients) 14 of a plurality of users connected to the server 12 through the network 16.

The server 12 performs various kinds of data processing for creating a composite image in response to an instruction from the terminal device 14, and is configured by, for example, a desktop personal computer (PC) or a workstation.

The terminal device 14 gives various instructions to the server 12 to perform various kinds of data processing, and is configured by, for example, a smartphone, a tablet PC, or a notebook PC.

The network 16 is, for example, a telephone line or the Internet circuit, and connects the server 12 and the terminal device 14 to each other by wired or wireless connection to enable bidirectional communication.

Figure 2:
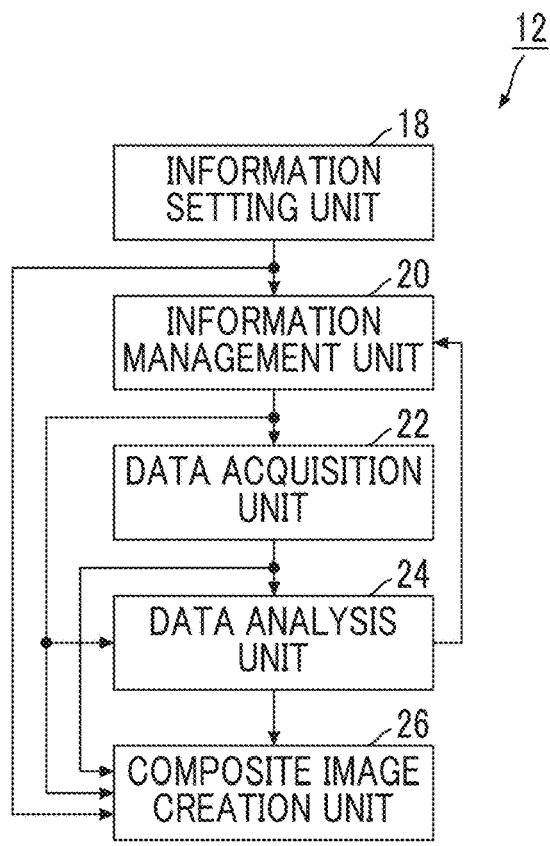
FIG. 2 is a block diagram of an embodiment showing the configuration of a server shown in FIG. 1.

FIG. 2 is a block diagram of an embodiment showing the configuration of the server shown in FIG. 1. The server 12 shown in FIG. 2 comprises an information setting unit 18 for setting various kinds of information regarding a composite image, an information management unit 20 for managing various kinds of information regarding the creation of a composite image, a data acquisition unit 22 for acquiring various kinds of data used in a composite image, a data analysis unit 24 for analyzing various kinds of data used in a composite image, and a composite image creation unit 26 for creating a composite image.

In the following description, among a plurality of users involved in the creation of a composite image including a main page and a writing page, one user who creates a composite image is expressed as a secretary user, and two or more users including the secretary user are expressed as participating users. For example, a case where a secretary is one of a group of friends corresponds to this.

However, in another embodiment, in a case where the secretary himself or herself provides neither photos nor messages, such as a case where a photo shop undertakes an agency as a secretary, it is assumed that the number of secretary users does not include the number of participating users.

Figure 3:
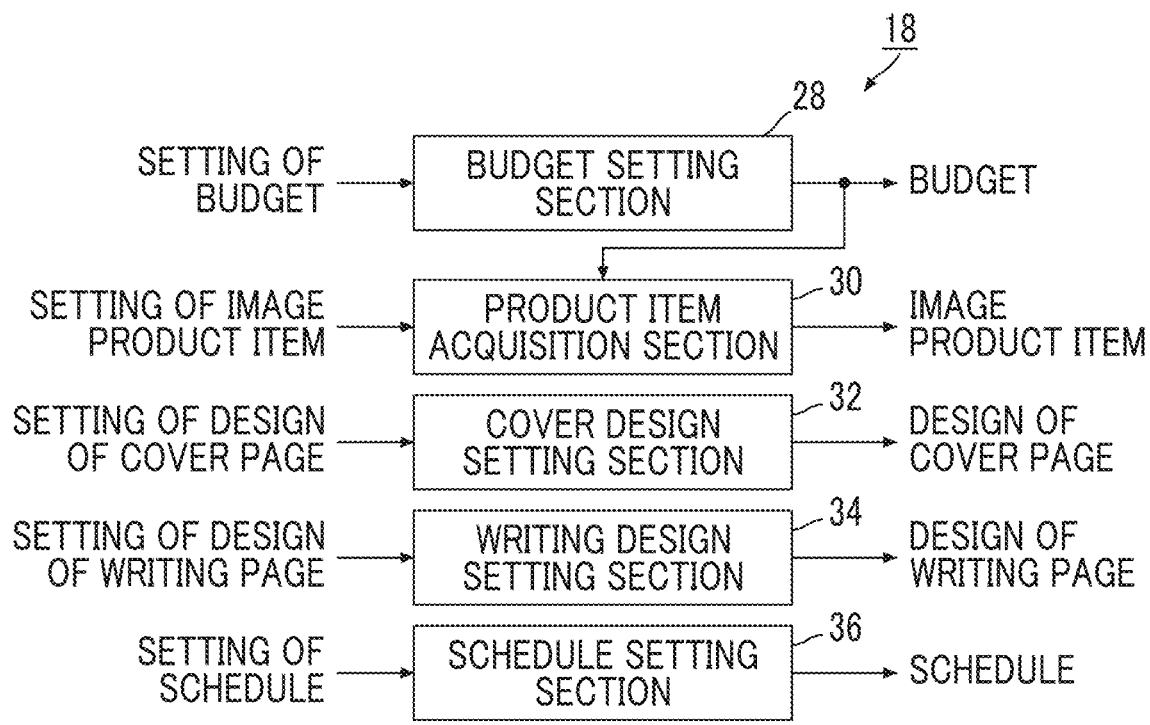
FIG. 3 is a block diagram of an embodiment showing the configuration of an information setting unit shown in FIG. 2.

FIG. 3 is a block diagram showing the configuration of an embodiment showing the configuration of the information setting unit shown in FIG. 2. The information setting unit 18 shown in FIG. 3 comprises a budget setting section 28, a product item acquisition section 30, a cover design setting section 32, a writing design setting section 34, and a schedule setting section 36.

The budget setting section 28 acquires information regarding a budget for a composite image, which is set by the secretary user, from the terminal device 14 of the secretary user through the network 16.

Then, the product item acquisition section 30 acquires one image product item set by the secretary user, among one or more image product items (information of image product items) with a size and the number of pages corresponding to the budget information acquired by the budget setting section 28, from the terminal device 14 of the secretary user through the network 16.

The image product item is an item for creating an image product, and includes, for example, a photo album such as a photobook, a shuffle print, a calendar with an image, and the like. Images are mainly photos.

In addition, image product items include a plurality of types of image product items having at least different sizes or different numbers of pages. The number of pages of the image product item is the number of pages including a main page and a writing page. An image product includes an image product of a paper medium and an image product of electronic data.

A page referred to in the present invention means a unit for performing images arrangement and writings arrangement. In the present embodiment, a page refers to a two-page spread page. However, in other embodiments, a page may be a single-sided page. In addition, a two-page spread page may be set as a unit in the image processing apparatus of the present embodiment, and the number of pages of the image product item may be displayed for the user with the single-sided page as a unit.

The photobook is, for example, a composite image obtained by arranging a plurality of images selected by the user on a plurality of pages in a layout that the user desires. In addition, the photobook may be a composite image obtained by arranging images, which are automatically selected from images in a desired period (for example, one year) that are held by the user, on a plurality of pages in an automatic layout (for example, an ear album manufactured by FUJIFILM Co., Ltd.). In addition, the shuffle print is a composite image obtained by arranging a plurality of images on one print by shuffling the plurality of images. The calendar with an image is a composite image obtained by arranging images corresponding to the calendar of each month, for example.

In the case of the present embodiment, a composite image is a photobook that includes a writing page at the end of the book. The writing page is a composite image in which messages for writing of two or more participating users acquired from the terminal devices 14 of the participating users are arranged. The message for writing is a message of each participating user used in the writing page.

In addition to the message for writing, a profile image may be placed on the writing page. Although the profile image is, for example, a face image of each participating user, other images may be used.

Then, the cover design setting section 32 acquires information regarding the design of one cover page set by the secretary user, among the designs of one or more cover pages, from the terminal device 14 of the secretary user through the network 16.

The information of the design of the cover page includes, for example, not only design information, such as a cover page pattern and illustrations drawn on the cover page, but also information of the title of a composite image described on the cover page, information of the color of the cover page, and the like.

Then, the writing design setting section 34 acquires information regarding the design of one writing page set by the secretary user, among the designs of one or more writing pages, from the terminal device 14 of the secretary user through the network 16.

The information of the design of the writing page includes, for example, information of a template in which positions, sizes, and the like for arranging the profile image and message for writing of each participating user on the writing page are set in advance.

Then, the schedule setting section 36 acquires schedule information, which includes the deadline for images and messages for writing set by the secretary user, a composite image creation period, and the delivery date of an image product, from the terminal device 14 of the secretary user through the network 16.

The deadline for images and messages for writing indicates a time limit by which each participating user can upload (submit) images and messages for writing, that is, a time limit by which the image processing apparatus 10 can acquire images and messages for writing from the terminal device 14 of the participating user.

In addition, the composite image creation period indicates a period during which the secretary user creates a composite image using a plurality of images acquired from the terminal devices 14 of a plurality of users, in other words, a time limit by which an image product can be ordered. The delivery date of an image product indicates a date to deliver the image product.

Figure 4:
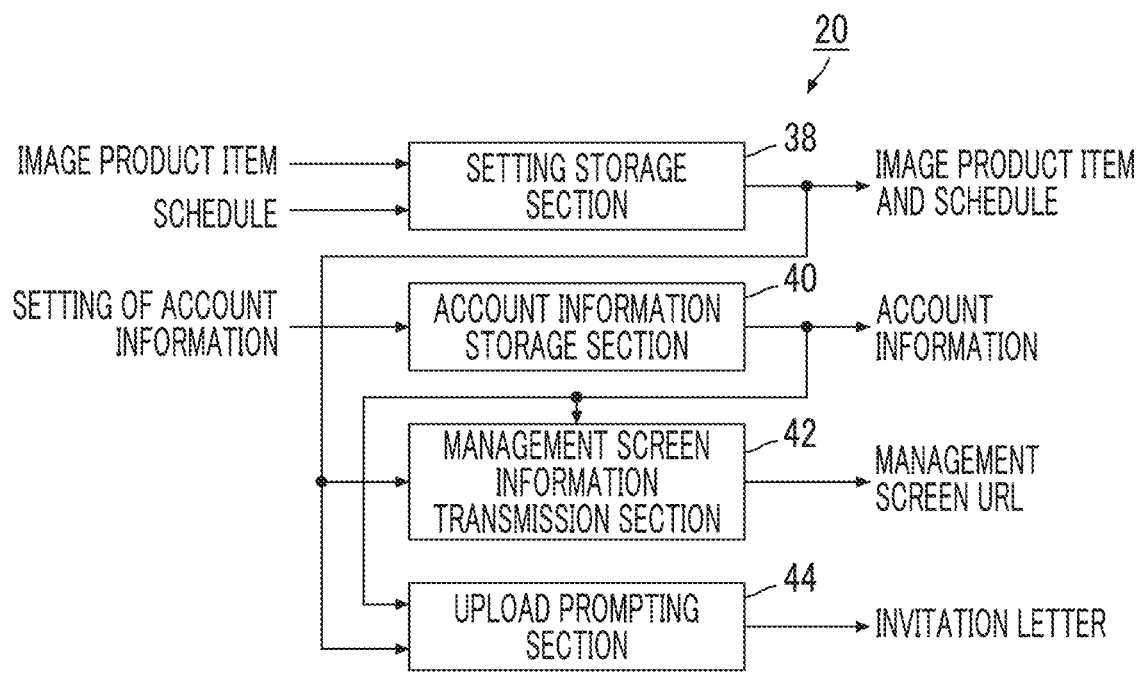
FIG. 4 is a block diagram of an embodiment showing the configuration of an information management unit shown in FIG. 2.

Next, FIG. 4 is a block diagram of an embodiment showing the configuration of the information management unit shown in FIG. 2. The information management unit 20 shown in FIG. 4 comprises a setting storage section 38, an account information storage section 40, a management screen information transmission section 42, and an upload prompting section 44.

The setting storage section 38 stores the information of the image product item acquired by the product item acquisition section 30 and the schedule acquired by the schedule setting section 36.

Then, the account information storage section 40 acquires secretary user account information set by the secretary user from the terminal device 14 of the secretary user through the network 16. In addition, the account information storage section 40 acquires participating user account information set by the participating user from the terminal device 14 of the participating user through the network 16, and stores the participating user account information.

For example, the secretary user account information is the e-mail address of the secretary user and the secretary password. On the other hand, the participating user account information is the name and individual password of the participating user (for the participating user, displayed as a "secret code" as shown in FIG. 28). The name of the participating user is used by the secretary user to manage the participating user, and the individual password is used by the image processing apparatus 10 to specify the participating user. In the case of the present embodiment, it is assumed that the secret code cannot be changed and reissued later.

Then, the management screen information transmission section 42 transmits a message, which includes a uniform resource locator (URL) required for the secretary user to access a management screen for managing an image product item, a schedule, and the like, to the terminal device 14 of the secretary user through the network 16. The secretary user can make changes to secretary users, addition of a secretary user (for example, addition of a deputy secretary described later), and the like in addition to changing the image product item and schedule from the management screen.

For example, the management screen information transmission section 42 transmits a message including a URL for accessing the management screen, to the e-mail address of the secretary user acquired by the account information storage section 40, by e-mail.

Then, the upload prompting section 44 sends an invitation letter created by the secretary user to the terminal device 14 of the participating user through the network 16.

The invitation letter is for inviting participating users to create a composite image, and is prompt information to prompt the participating users to upload images to be used in a composite image, evaluation information for each image, a profile image, a message for writing, and the like.

The upload prompting section 44 sends the invitation letter to the terminal device 14 of each participating user through a message of social networking service (SNS) or by e-mail, for example.

Figure 5:
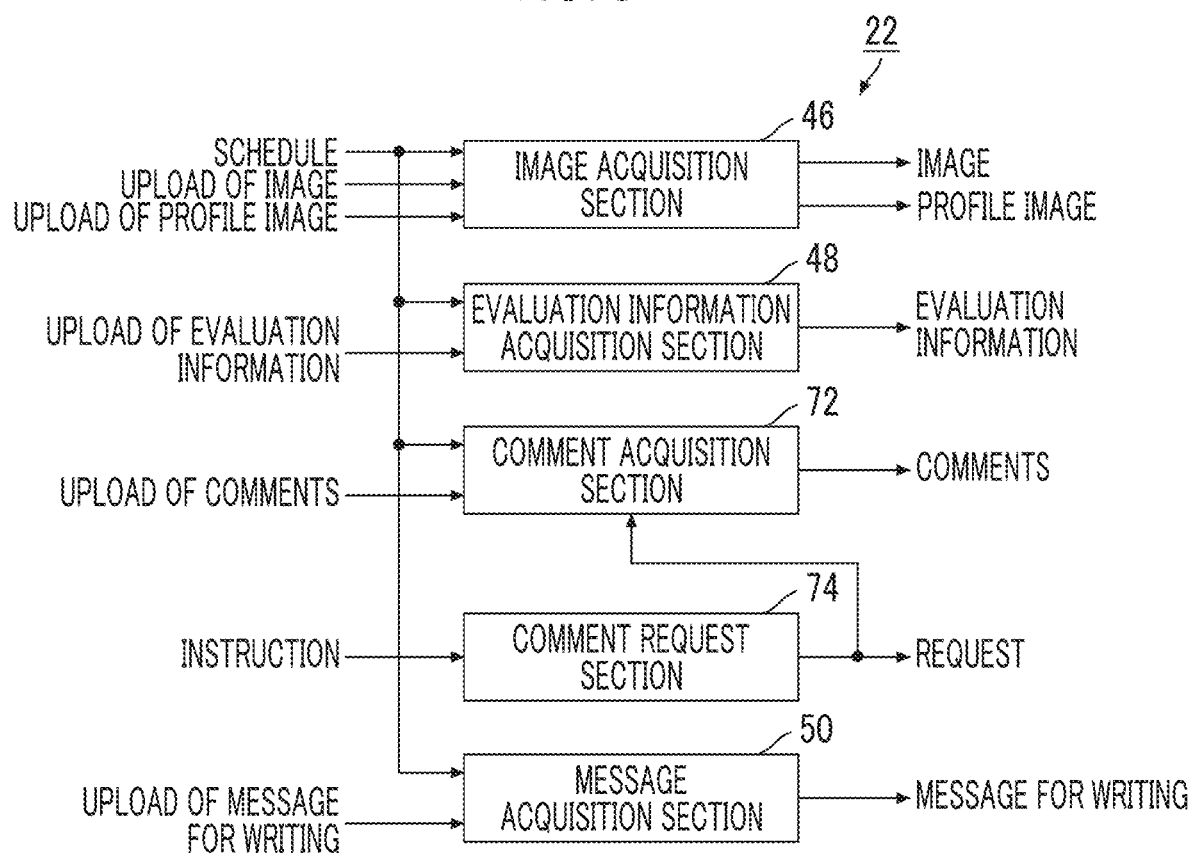
FIG. 5 is a block diagram of an embodiment showing the configuration of a data acquisition unit shown in FIG. 2.

Next, FIG. 5 is a block diagram of an embodiment showing the configuration of the data acquisition unit shown in FIG. 2. The data acquisition unit 22 shown in FIG. 5 comprises an image acquisition section 46, an evaluation information acquisition section 48, a comment acquisition section 72, a comment request section 74, and a message acquisition section 50.

The image acquisition section 46 acquires a plurality of images (image group) transmitted through the network 16 from the terminal devices 14 of two or more participating users for a predetermined period, in the case of the present embodiment, a period until the deadline for images and messages for writing set by the schedule setting section 36 after the invitation letter is sent. In addition, the image acquisition section 46 acquires the profile image of each participating user set by the participating user.

The image acquisition section 46 acquires a plurality of images (image group) transmitted through the network 16 from the terminal devices 14 of the participating users. Then, the image acquisition section 46 stores the images so as to be associated with information indicating from which participating users the plurality of images have been transmitted. Also for the profile images transmitted through the network 16 from the terminal devices 14 of the participating users, the image acquisition section 46 stores the profile images so as to be associated with information indicating from which participating users the profile images have been transmitted.

The image acquisition section 46 can also acquire a plurality of images from a plurality of participating users without passing through the network 16, for example, by making each participating user input images of each participating user stored in a storage device, such as a secure digital (SD) card, in the server 12.

Then, the evaluation information acquisition section 48 acquires evaluation information indicating evaluation for each image given by two or more participating users, through the network 16, from the terminal devices 14 of the two or more participating users for the same predetermined period.

The evaluation information of an image is information indicating the evaluation of each participating user for each image, for example, high evaluation or low evaluation.

The evaluation information acquisition section 48 can also acquire evaluation information for each image from a plurality of participating users without passing through the network 16, for example, by making each participating user give evaluation information for each image in the server 12.

Then, the comment acquisition section 72 acquires comments given to each of the plurality of images by each of the plurality of participating users, through the network 16, from the terminal devices 14 of the plurality of participating users for the same predetermined period.

The comment acquisition section 72 can also acquire comments given to each image by the plurality of participating users without passing through the network 16, for example, by making each participating user give comments to each image in the server 12.

Then, the comment request section 74 requests the terminal devices 14 of the plurality of participating users to send comments on a third image that is an image designated by the secretary user, among the plurality of images acquired by the image acquisition section 46, through the network 16.

For example, by displaying a comment request message on the image display unit of the terminal device 14 of each participating user, the comment request section 74 can request the participating user to send comments without passing through the network 16.

Then, the message acquisition section 50 acquires the message for writing uploaded by each participating user from the terminal device 14 of each participating user through the network 16 for the same predetermined period.

For the messages for writing transmitted through the network 16 from the terminal devices 14 of the participating users, the message acquisition section 50 stores the messages for writing so as to be associated with information indicating from which participating users the messages for writing have been transmitted.

The message acquisition section 50 can also acquire messages for writing from a plurality of participating users without passing through the network 16, for example, by making each participating user input a message for writing in the server 12.

Figure 6:
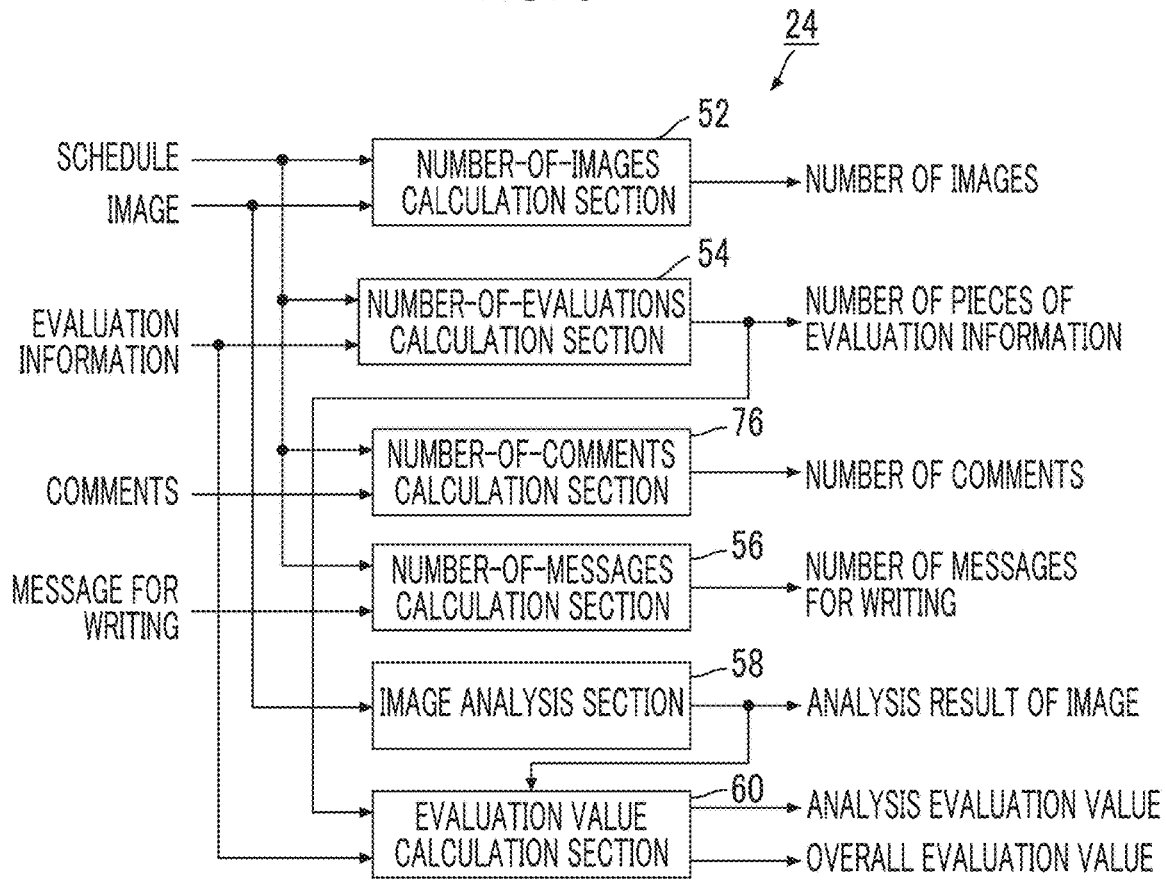
FIG. 6 is a block diagram of an embodiment showing the configuration of a data analysis unit shown in FIG. 2.

Next, FIG. 6 is a block diagram of an embodiment showing the configuration of the data analysis unit shown in FIG. 2. The data analysis unit 24 shown in FIG. 6 comprises a number-of-images calculation section 52, a number-of-evaluations calculation section 54, a number-of-comments calculation section 76, a number-of-messages calculation section 56, an image analysis section 58, and an evaluation value calculation section 60.

The number-of-images calculation section 52 calculates the number of images acquired by the image acquisition section 46 after a predetermined period has passed since the invitation letter was sent by the upload prompting section 44, that is, after the deadline for images and messages for writing has passed.

Then, the number-of-evaluations calculation section 54 calculates the number of pieces of evaluation information indicating high evaluation and low evaluation given to each image, which have been acquired by the evaluation information acquisition section 48, after the deadline for images and messages for writing has passed.

Then, the number-of-comments calculation section 76 similarly calculates the number of comments given to each image, which have been acquired by the comment acquisition section 72 after the deadline for images and messages for writing has passed.

Then, the number-of-messages calculation section 56 similarly calculates the number of messages for writing acquired by the message acquisition section 50 after the deadline for images and messages for writing has passed.

Then, the image analysis section 58 analyzes the contents of each image acquired by the image acquisition section 46. In the case of the present embodiment, the image analysis section 58 performs image analysis every time an image is acquired by the image acquisition section 46.

For example, the image analysis section 58 analyzes the brightness or color of an image, the degree of bokeh and blurring, and the like. In addition, in a case where a person's face is included in the image, the image analysis section 58 analyzes the size of the face, position of the face, direction of the face, skin color of the face, facial expression such as a smiling face, eye line, the number of persons included in the image, positional relationship of persons, and the like.

Then, the evaluation value calculation section 60 calculates the analysis evaluation value of each image based on the analysis result of each image by the image analysis section 58. In addition, based on at least one of the evaluation information indicating high evaluation and low evaluation for each image acquired by the evaluation information acquisition section 48 or the comments given to each image acquired by the comment acquisition section 72, the evaluation value calculation section 60 calculates an overall evaluation value of each image by adding or subtracting a value to or from the analysis evaluation value of each image or by giving a weighting to the analysis evaluation value of each image.

The evaluation value calculation section 60 can calculate an overall evaluation value of each image, for example, by adding a value to the analysis evaluation value of each image based on the number of pieces of evaluation information indicating high evaluation, which has been calculated by the number-of-evaluations calculation section 54, and subtracting a value from the analysis evaluation value of each image based on the number of pieces of evaluation information indicating low evaluation. In addition, the evaluation value calculation section 60 can calculate the overall evaluation value of each image by adding a value to the analysis evaluation value of the image based on the number of comments calculated by the number-of-comments calculation section 76. That is, the giving of comments can be regarded as equivalent to the giving of evaluation information indicating high evaluation.

Since the analysis evaluation value of each image is calculated based on the analysis result of the image, the analysis evaluation value of the image is a reference for determining whether or not the image is good or poor. Accordingly, it can be said that the higher the analysis evaluation value, the higher the image quality.

Since the overall evaluation value of an image is calculated based not only on the analysis result of the image but also on evaluation information indicating high evaluation and low evaluation that is given by the participating user and comments given by the participating user, the overall evaluation value of the image is a reference for determining the preference of the participating user in addition to the good or bad of the image. Accordingly, it can be said that the higher the overall evaluation value, the higher the image quality or the more favorite image of the participating user.

Figure 7:
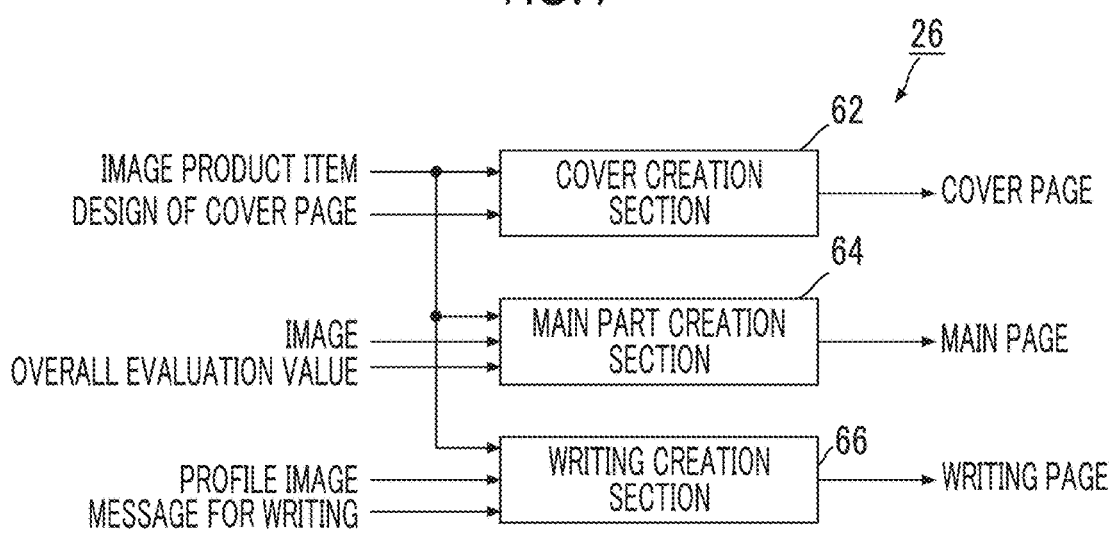
FIG. 7 is a block diagram of an embodiment showing the configuration of a composite image creation unit shown in FIG. 2.

Next, FIG. 7 is a block diagram of an embodiment showing the configuration of the composite image creation unit shown in FIG. 2. The composite image creation unit 26 shown in FIG. 7 comprises a cover creation section 62, a main part creation section 64, and a writing creation section 66.

The cover creation section 62 creates a cover page of the design corresponding to the information of the product item stored in the setting storage section 38 and the information of the design of the cover page acquired by the cover design setting section 32.

Then, the main part creation section 64 creates main pages of the number of pages (pages other than the cover page and the writing page) corresponding to the information of the product item stored in the setting storage section 38 using a plurality of images acquired by the image acquisition section 46. The main part creation section 64 creates a composite image corresponding to the information of the product item stored in the setting storage section 38, in the case of the present embodiment, the main page of the photobook.

Figure 8:
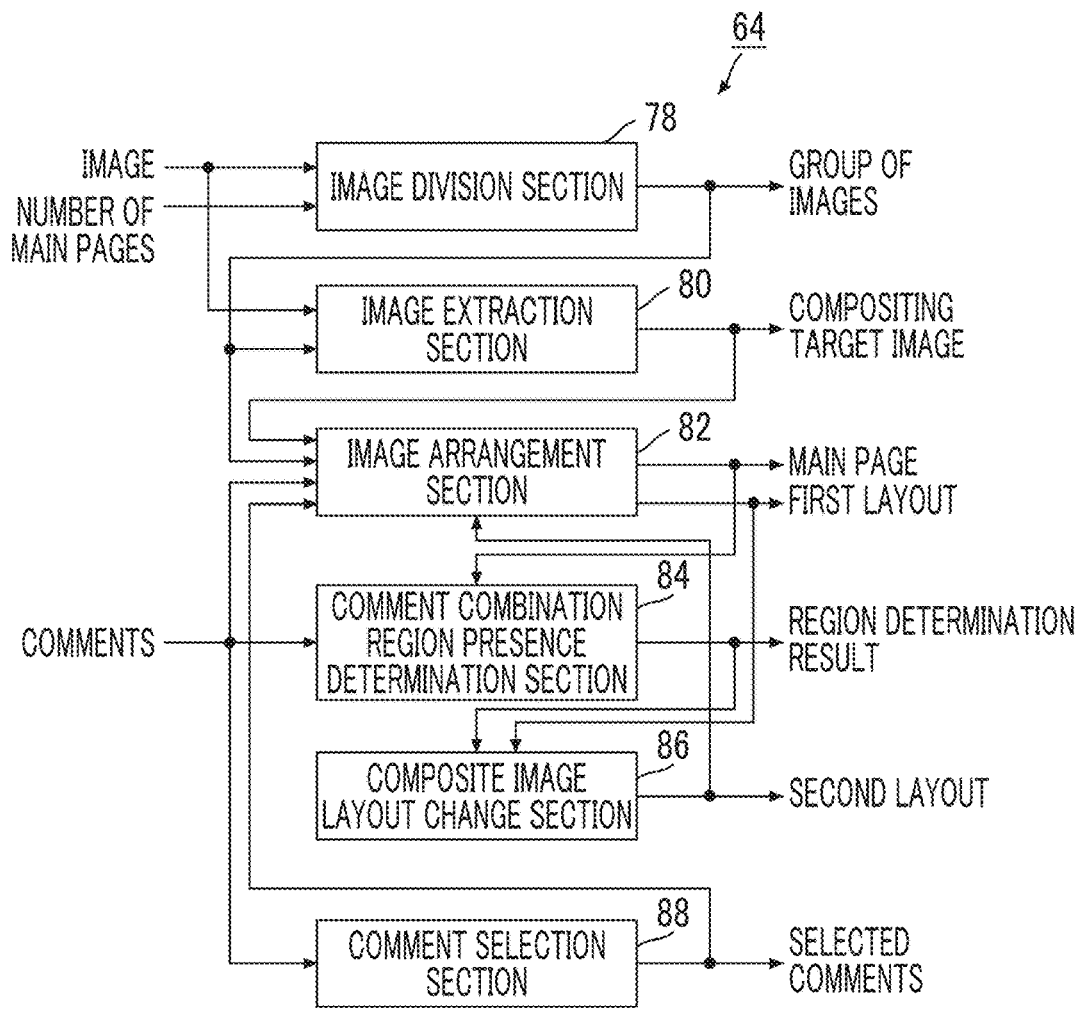
FIG. 8 is a block diagram of an embodiment showing the configuration of a main part creation section shown in FIG. 7.

As shown in FIG. 8, the main part creation section 64 comprises an image division section 78, an image extraction section 80, an image arrangement section 82, a comment combination region presence determination section 84, a composite image layout change section 86, and a comment selection section 88.

The image division section 78 divides a plurality of images acquired by the image acquisition section 46 into groups, the number of which corresponds to the number of main pages.

The image extraction section 80 extracts two or more images including one or more first images that are images to which comments have been given, among the plurality of images, as compositing target images to be used in the main page.

In the case of the present embodiment, for each group of images, the image extraction section 80 extracts a plurality of images to be used in the main page, among images included in the group, as compositing target images based on the overall evaluation value of each image.

The image arrangement section 82 determines the size of each compositing target image extracted by the image extraction section 80 and the arrangement position in the main page, as a first layout, based on the overall evaluation value of each image, for each group of images, and arranges (automatically lays out) the compositing target images in the main pages of pages corresponding to the group of images in the first layout to create the main pages.

The first layout is a layout in which the number of compositing target images arranged in the main page, sizes and arrangement positions of the respective compositing target images, and the like are determined without arranging the comments given to the first image arranged in the main page.

Then, the comment combination region presence determination section 84 determines whether or not a region where comments given to the first image are to be combined is present around a compositing target image in the arrangement region of compositing target images in the main page created by the image arrangement section 82. That is, it is determined whether or not a comment can be arranged in a region other than the arrangement region of compositing target images in the arrangement region of compositing target images in the main page.

Then, in a case where the comment combination region presence determination section 84 determines that a region where comments given to the first image are to be combined is present around the compositing target image, the composite image layout change section 86 changes the first layout determined by the image arrangement section 82 to a second layout for combining the compositing target image with the comments given to the first image.

The second layout is a layout obtained by changing at least one of the size of each compositing target image, the number of compositing target images, or the arrangement position of comments given to the first image in the first layout based on the first layout and the number of comments given to the first image arranged in the main page so that the compositing target images and the comments given to the first image can be combined.

Then, in a case where a plurality of comments are given to one first image, the comment selection section 88 selects a smaller number of comments than a plurality of comments given to the one first image, among the plurality of comments given to the one first image, as selected comments.

Then, the writing creation section 66 creates a writing page using a message for writing and a profile image of each participating user that have been acquired by the message acquisition section 50. The writing creation section 66 creates a writing page of the design corresponding to the information of the product item stored in the setting storage section 38 and the information of the design of the writing acquired by the writing design setting section 34.

Although not shown, the writing creation section 66 includes a message division section, a message arrangement section, and the like.

The message division section divides messages for writing acquired by the message acquisition section 50 into groups, the number of which corresponds to the number of writing pages.

For each group of messages for writing, the message arrangement section arranges a message for writing included in the group on the writing page of the page corresponding to the group of messages for writing.

The number of writing pages is set according to the number of participating users, the number of messages for writing, and the like. In addition, the number of main pages is set according to the number of pages of a composite image, the number of writing pages, and the like. In the case of the present embodiment, it is assumed that a 16-page photobook is created by setting the number of participating users to 2 to 36 persons and arranging 2 to 12 messages for writing on the writing page of one page.

Each section that forms the information setting unit 18, the information management unit 20, the data acquisition unit 22, the data analysis unit 24, and the composite image creation unit 26 is realized, for example, by causing a control device, such as a central processing unit (CPU), to execute a program loaded onto the memory. The data stored in each section is stored in a storage device, such as a hard disk drive (HDD), a solid state drive (SSD), and a secure digital (SD) memory, for example.

Figure 9:
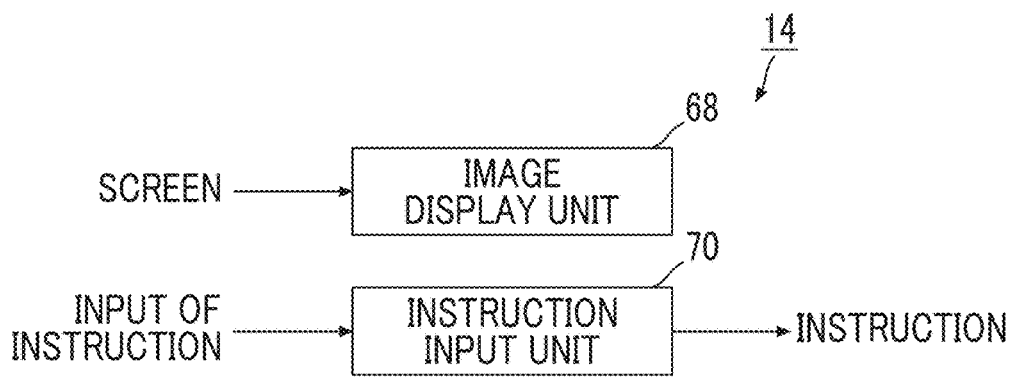
FIG. 9 is a block diagram of an embodiment showing the configuration of a terminal device of a user shown in FIG. 1.

Next, FIG. 9 is a block diagram of an embodiment showing the configuration of the terminal device of each user shown in FIG. 1. The terminal device 14 of each user shown in FIG. 9 includes an image display unit 68 and an instruction input unit 70.

In the terminal device 14, the image display unit 68 displays various setting screens, selection screens, check screens, input screens, creation screens, and the like, and is formed by a display device, such as a liquid crystal display, for example.

Then, the instruction input unit 70 acquires various setting instructions, selection instructions, check instructions, input instructions, creation instructions, and the like input by the user, and is formed by input devices, such as a keyboard and a mouse.

In the case of the present embodiment, the image display unit 68 and the instruction input unit 70 are formed by a device in which a display device and an input device are integrated, such as a touch panel.

The number of terminal devices 14 corresponding to each user involved in the creation of a composite image does not necessarily to be one, and a plurality of terminal devices 14 may correspond to each user as long as the terminal devices 14 can correspond to the account of each user in the image processing apparatus 10.

Although not shown, each of the server 12 and the terminal device 14 includes, for example, a transmission and reception unit, which is a communication device for transmitting and receiving various kinds of data between the server 12 and the terminal device 14, and a control unit, which is a CPU for controlling the operation of each unit.

Figure 10:
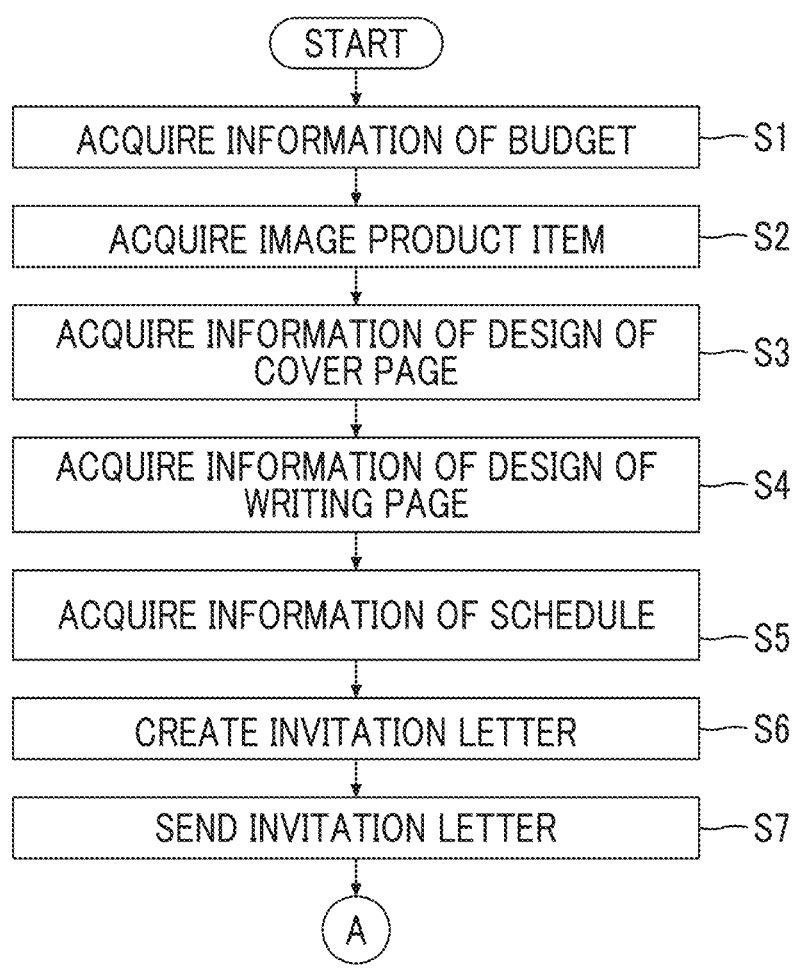
FIG. 10 is a flowchart of an embodiment showing the operation of the image processing apparatus shown in FIG. 1.
Figure 11:
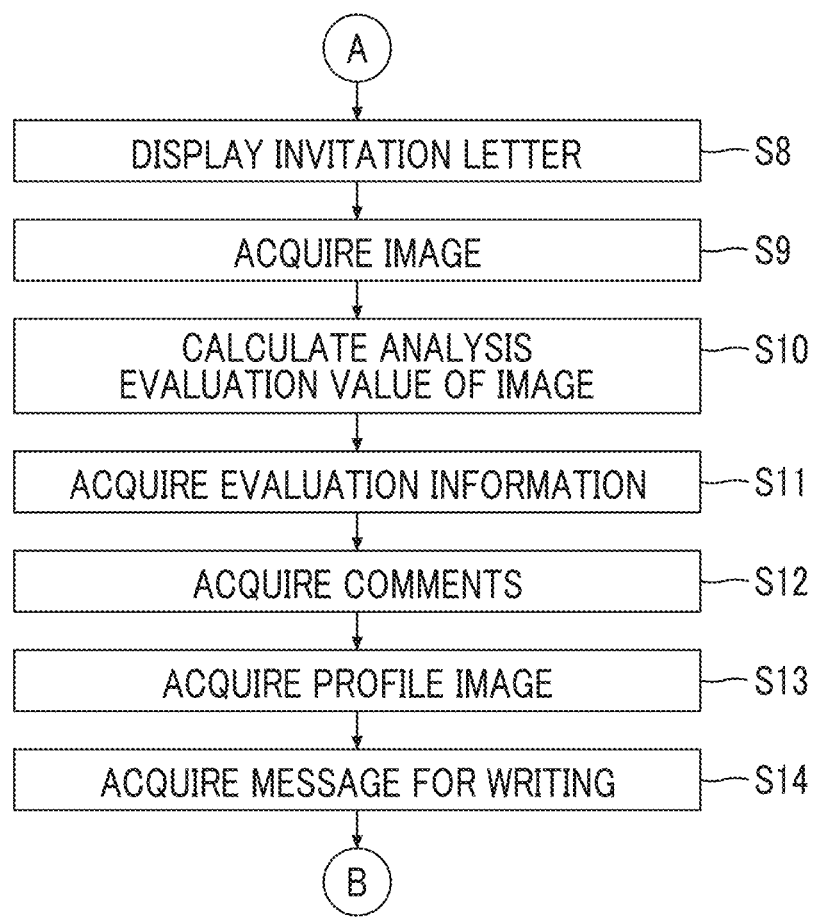
FIG. 11 is a flowchart of an embodiment showing the operation of the image processing apparatus subsequent to FIG. 10.
Figure 12:
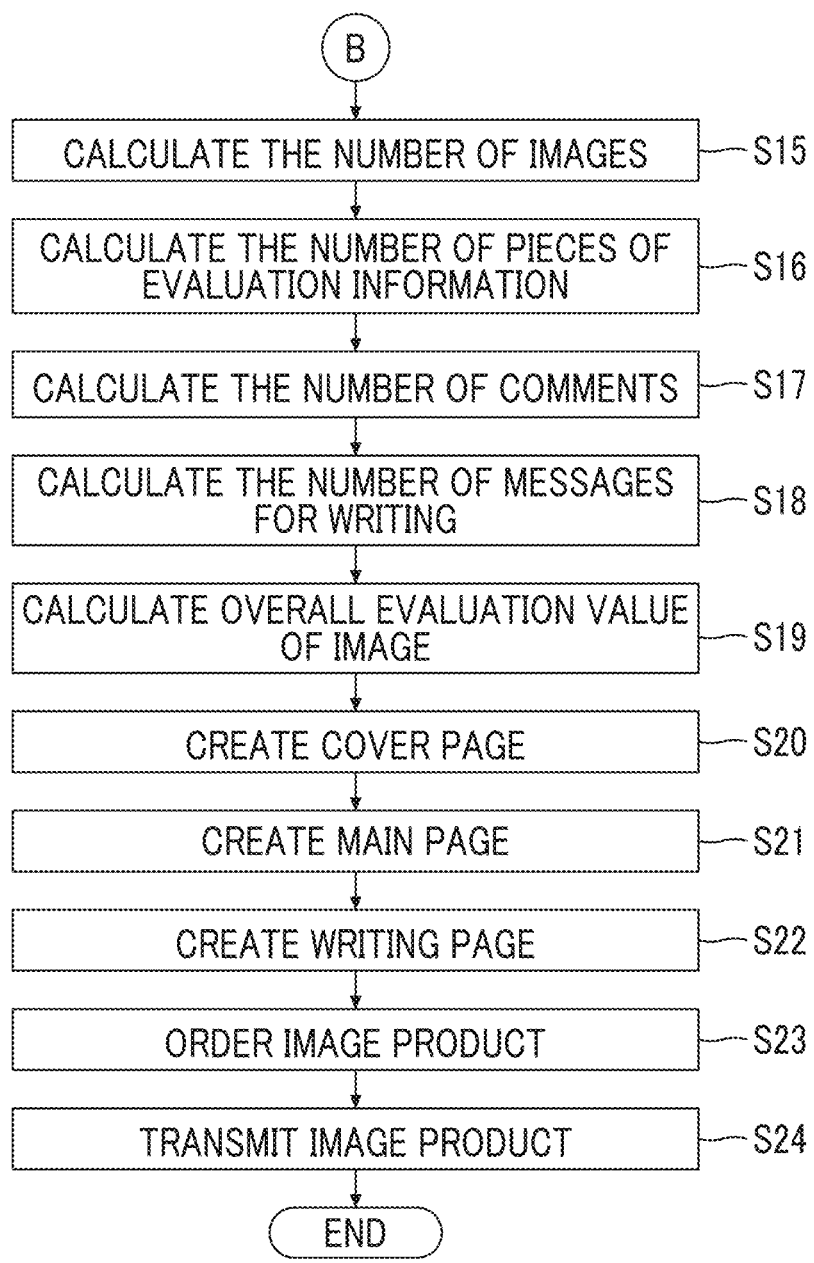
FIG. 12 is a flowchart of an embodiment showing the operation of the image processing apparatus subsequent to FIG. 11.

Next, the operation of the image processing apparatus 10 will be described with reference to flowcharts shown in FIGS. 10 to 12 and a display screen shown in FIGS. 13 to 36.

In the case of creating a composite image, first, a secretary user accesses a website for creating a composite image, which is provided by the image processing apparatus 10, through the instruction input unit 70 in the terminal device 14 of the secretary user.

Figure 13:
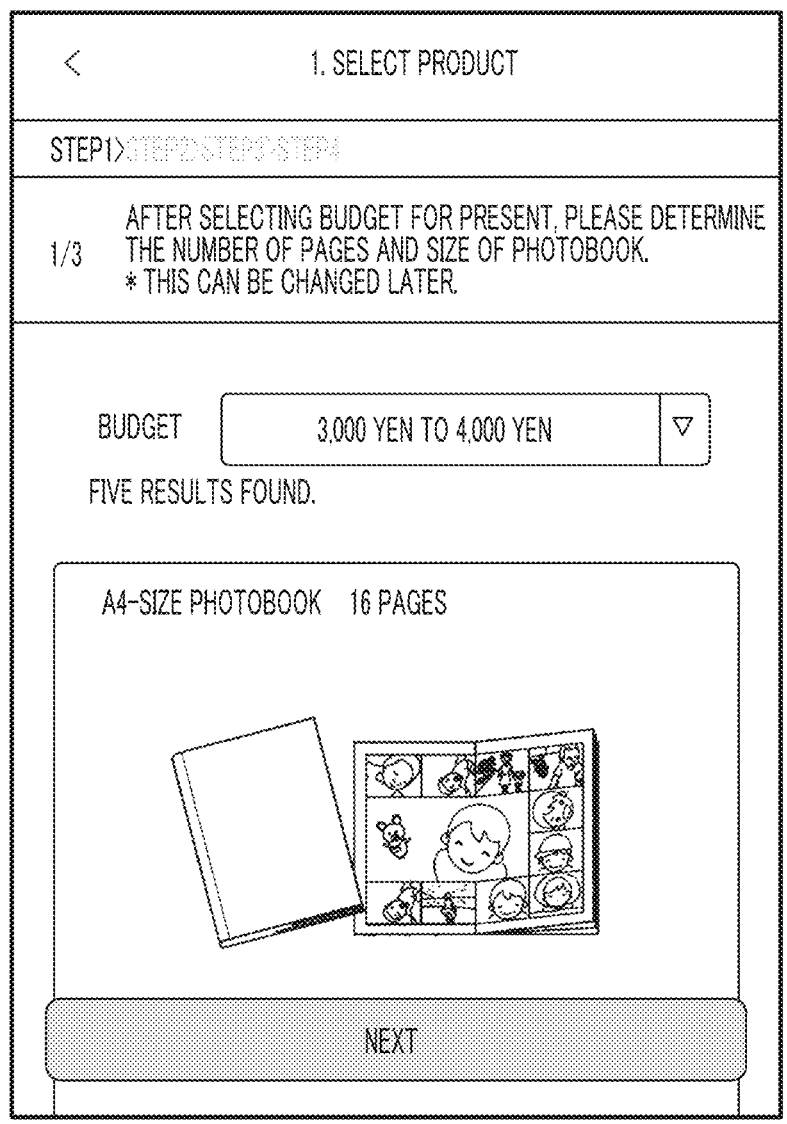
FIG. 13 is a conceptual diagram of an example showing a screen for setting a budget for a composite image.

In a case where the secretary user accesses the website for creating a composite image, as shown in FIG. 13, a screen for setting a budget for the composite image is displayed on the image display unit 68 of the terminal device 14 of the secretary user by the budget setting section 28.

The secretary user sets a budget for the composite image to be created by the secretary user, through the instruction input unit 70, on the screen for setting the budget for the composite image. In the example shown in FIG. 13, a list of budgets for the composite image is registered in advance by the pull-down menu. The secretary user selects and sets one budget, for example, 3000 yen to 4000 yen, from the list of budgets for the composite image registered in the pull-down menu.

In a case where the budget for the composite image is set, the information of the budget for the composite image set by the secretary user is acquired from the terminal device 14 of the secretary user by the budget setting section 28 (step S1).

Then, one or more image product items corresponding to the information of the budget is presented by the product item acquisition section 30. In the example shown in FIG. 13, five photobooks having different sizes and number of pages are presented as image product items.

In a case where the image product items are presented, a screen for setting one image product item among the one or more presented image product items is displayed on the image display unit 68 of the terminal device 14 of the secretary user by the product item acquisition section 30.

The secretary user selects and sets one image product item, among the one or more presented image product items, through the instruction input unit 70 on the screen for setting an image product item. In the example shown in FIG. 13, a 16-page photobook of A4 size is set.

After a photobook is set as an image product item, in a case where a "Next" button is pressed, for example, in a case where the "Next" button is tapped or clicked, one image product item set by the secretary user is acquired by the product item acquisition section 30 (step S2).

In addition, in a case where a "<" button is pressed, it is possible to return to the previous screen. The same is true for subsequent screens.

Figure 14:
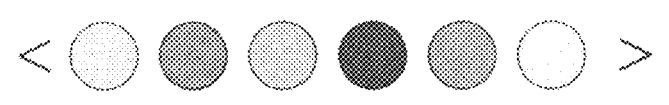
FIG. 14 is a conceptual diagram of an example showing a screen for setting the design of the cover page of a photobook.

Then, as shown in FIG. 14, a screen for setting the design of the cover page of the photobook is displayed on the image display unit 68 of the terminal device 14 of the secretary user by the cover design setting section 32.

On the screen for setting the design of the cover page, the secretary user selects and sets the design of one cover page among the designs of one or more cover pages, in the example shown in FIG. 14, designs of three cover pages, through the instruction input unit 70. As the information of the design of the cover page of the photobook, for example, the secretary user can set the title of the photobook up to 20 characters to be described on the cover page and the color of the cover page.

After the design of the cover page is set, in a case where the "Next" button is pressed, the information of the design of the cover page set by the secretary user is acquired from the terminal device 14 of the secretary user by the cover design setting section 32 (step S3).

Figure 15:
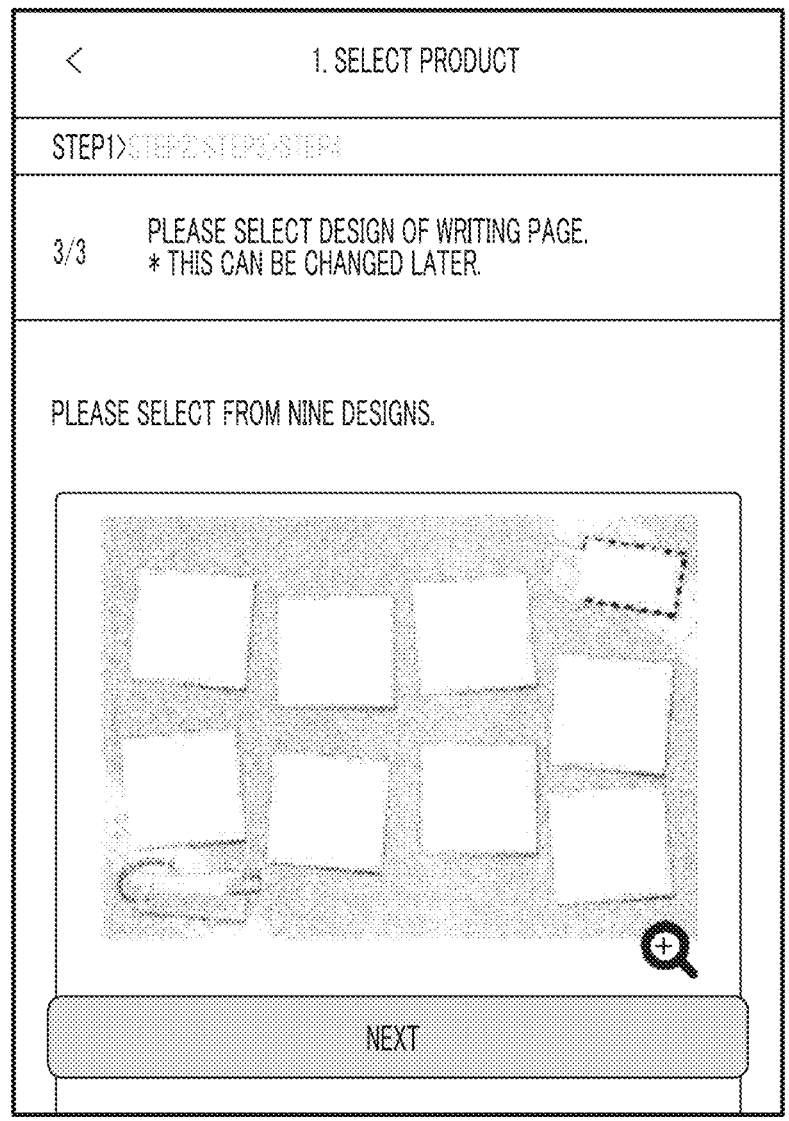
FIG. 15 is a conceptual diagram of an example showing a screen for setting the design of the writing page of a photobook.

Then, as shown in FIG. 15, a screen for setting the design of the writing page of the photobook is displayed on the image display unit 68 of the terminal device 14 of the secretary user by the writing design setting section 34.

On the screen for setting the design of the writing page, the secretary user selects and sets one writing design among one or more writing designs, in the example shown in FIG. 15, nine writing designs, through the instruction input unit 70.

After the design of the writing page is set, in a case where the "Next" button is pressed, the information of the design of the writing page set by the secretary user is acquired from the terminal device 14 of the secretary user by the writing design setting section 34 (step S4).

Figure 16:
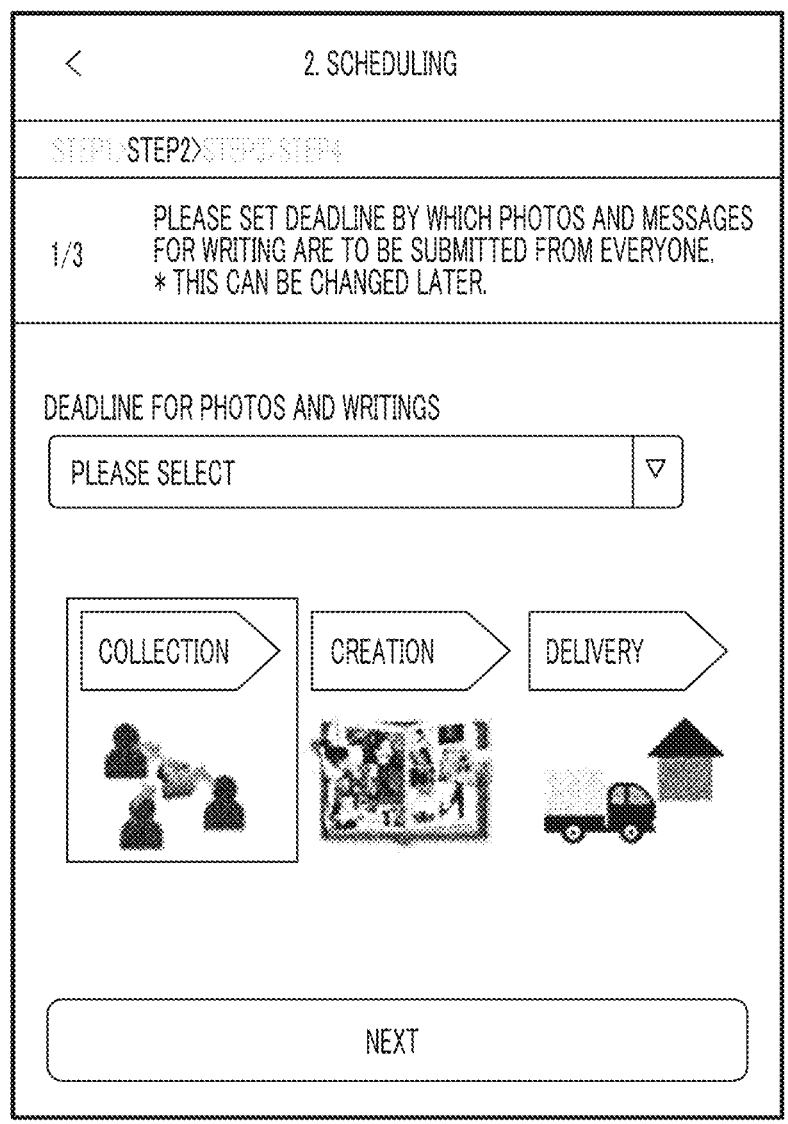
FIG. 16 is a conceptual diagram of an example showing a screen for setting the deadline for images and messages for writing.

Then, as shown in FIG. 16, a screen for setting the deadline for images and messages for writing is displayed on the image display unit 68 of the terminal device 14 of the secretary user by the schedule setting section 36.

The secretary user sets the deadline for images and messages for writing, through the instruction input unit 70, on the screen for setting the deadline for images and messages for writing. In the example shown in FIG. 16, a list of dates within a predetermined period from the current date is registered in advance by the pull-down menu. The secretary user selects and sets one date, for example, December 2, as the deadline, from the list of dates registered in the pull-down menu.

After the deadline for images and messages for writing is set, in a case where the "Next" button is pressed, the information of the deadline for images and messages for writing set by the secretary user is acquired from the terminal device 14 of the secretary user by the schedule setting section 36 (step S5).

Figure 17:
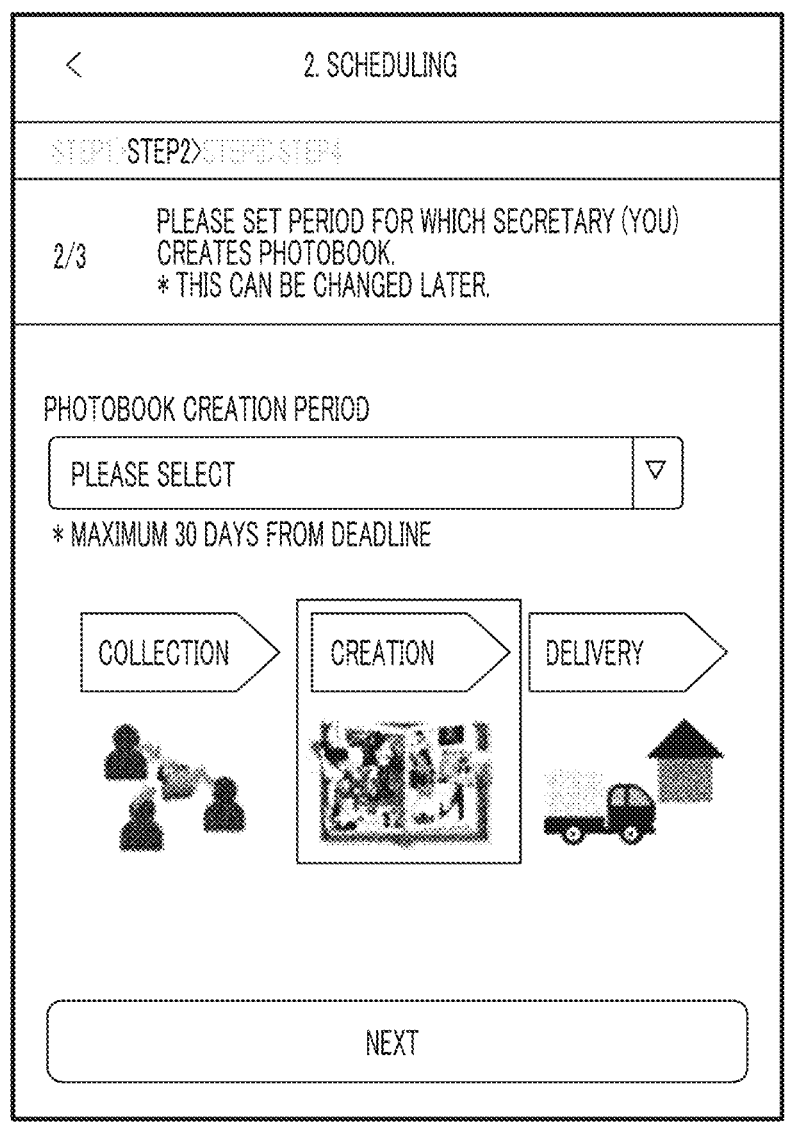
FIG. 17 is a conceptual diagram of an example showing a screen for setting a composite image creation period.

Then, as shown in FIG. 17, a screen for setting a composite image creation period is displayed on the image display unit 68 of the terminal device 14 of the secretary user by the schedule setting section 36.

The secretary user sets a composite image creation period, through the instruction input unit 70, on the screen for setting the composite image creation period. In the example shown in FIG. 17, a list of dates within 30 days from the deadline for the period of images and messages for writing is registered in advance by the pull-down menu. The secretary user sets December 2 to 4 as a creation period by selecting one date, for example, December 4 from the list of dates registered in the pull-down menu.

After the composite image creation period is set, in a case where the "Next" button is pressed, the information of the composite image creation period set by the secretary user is acquired from the terminal device 14 of the secretary user by the schedule setting section 36 (step S5).

Figure 18:
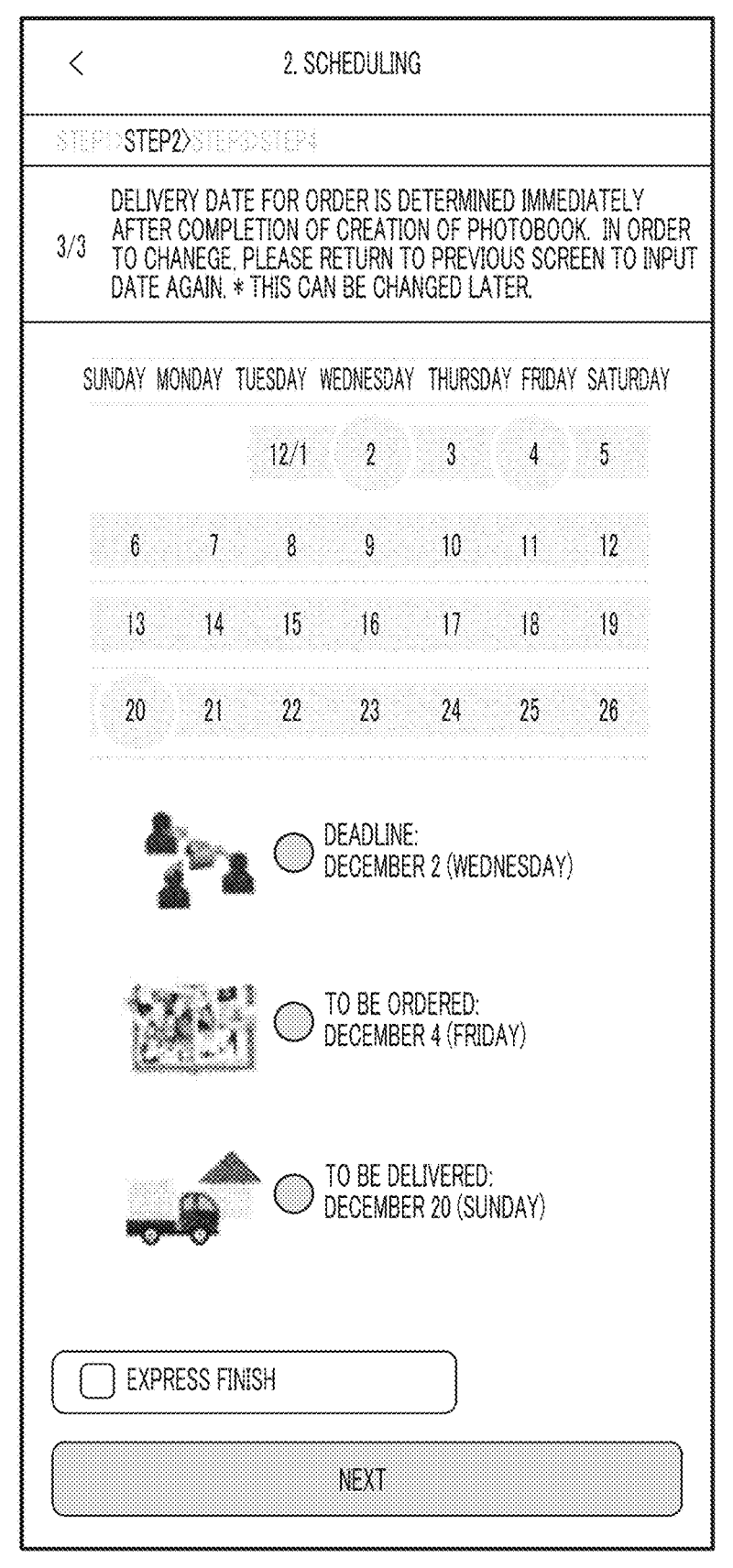

Then, as shown in FIG. 18, a screen for setting the image product delivery date is displayed on the image display unit 68 of the terminal device 14 of the secretary user by the schedule setting section 36.

The image product delivery date is automatically set to a date after a predetermined period from the deadline of the composite image creation period, in the example shown in FIG. 18, December 20 after 16 days from December 4 that is the last day of the composite image creation period, by the schedule setting section 36.

The secretary user can change the image product delivery date, through the instruction input unit 70, on the screen for setting the image product delivery date. In the example shown in FIG. 18, it is possible to set the image product delivery date to a date before December 20, for example, by paying an extra fee and specifying the express finish.

After the image product delivery date is set, in a case where the "Next" button is pressed, the information of the image product delivery date is acquired by the schedule setting section 36 (step S5).

In the case of creating a composite image using a plurality of images transmitted from the terminal devices 14 of the plurality of users, it is difficult to manage the time limit. In the image processing apparatus 10, however, since it is possible to manage the time limit, the burden on the secretary user can be reduced.

Figure 19:
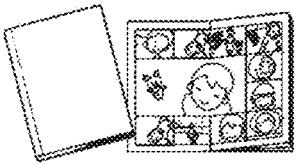
FIG. 19 is a conceptual diagram of an example showing a screen for checking the information of image product items and a schedule.

Then, as shown in FIG. 19, a screen for checking the information of the image product item and the schedule is displayed on the image display unit 68 of the terminal device 14 of the secretary user by the setting storage section 38.

On the screen for checking the information of the image product item and the schedule, the secretary user checks the information of the image product item and the schedule. In a case where the setting is acceptable, a "Save/login" button is pressed to proceed to the next screen. In a case where it is necessary to change the setting, the "<" button is pressed to return to the previous screen.

In a case where the "Save/login" button is pressed, as shown in FIG. 20, a screen for the secretary user to input account information for logging in to the image processing apparatus 10 is displayed on the image display unit 68 of the terminal device 14 of the secretary user by the setting storage section 38.

The secretary user inputs the e-mail address of the secretary user and the secretary password, as account information for logging in to the image processing apparatus 10, through the instruction input unit 70. In a case where the secretary user has already completed membership registration to the image processing apparatus 10, a "Login" button is pressed. In a case where the secretary user has forgotten the secretary password after membership registration, processing for recovering the secretary password is performed by pressing a "Password forgot" button.

In a case where the "Login" button is pressed, the account information already stored is compared with the account information input by the secretary user by the account information storage section 40. In a case where the account information already stored matches the account information input by the secretary user, the secretary user can log in to the image processing apparatus 10.

On the other hand, in a case where membership registration has not yet been completed, processing for new membership registration is performed by pressing a "New membership registration" button. In a case where the "New membership registration" button is pressed, the e-mail address and the secretary password input by the secretary user are acquired and are stored as the account information of the secretary user by the account information storage section 40. After the membership registration is completed, the terminal device 14 of the secretary user can log in to the image processing apparatus 10.

Then, the information of the image product item acquired by the product item acquisition section 30 and the schedule acquired by the schedule setting section 36 is stored by the setting storage section 38.

Then, as shown in FIG. 21, a screen showing that the login of the secretary user and the storage of the information of the image product item and the schedule have been completed is displayed on the image display unit 68 of the terminal device 14 of the secretary user by the setting storage section 38.

Then, a message including the URL for accessing the management screen is transmitted by the management screen information transmission section 42. The message includes a notice indicating that the information of the image product item and the schedule has been stored.

In the example shown in FIG. 21, a message including the URL for accessing the management screen can be transmitted not only to the e-mail address of the secretary user but also to the e-mail address of participating users other than the secretary user, for example, the e-mail address of a deputy secretary user who acts as a secretary user, by inputting the e-mail address of participating users other than the secretary user through the instruction input unit 70.

Then, in a case where the "Next" button is pressed, as shown in FIG. 22, a screen for creating an invitation letter to be sent to the terminal device 14 of the participating user is displayed on the image display unit 68 of the terminal device 14 of the secretary user by the upload prompting section 44.

On the screen for creating an invitation letter, the secretary user inputs a message included in the invitation letter within a predetermined number of characters, in the example shown in FIG. 22, 150 characters, through the instruction input unit 70. In the example shown in FIG. 22, an initial message "Let's make a photobook with your photos and messages!" is automatically input. Therefore, it is possible to save the time and effort for the secretary user to input a message. The secretary user may use the initial message as it is, or may input other messages.

In a case where the "Next" button is pressed, the information of a message included in the invitation letter is acquired by the upload prompting section 44, so that the invitation letter is created (step S6).

Then, as shown in FIG. 23, a screen for checking the contents of the invitation letter is displayed on the image display unit 68 of the terminal device 14 of the secretary user by the upload prompting section 44.

On the screen for checking the contents of the invitation letter, the secretary user checks the contents of the invitation letter. In a case where the contents are acceptable, a "To invitation letter send screen" button is pressed to proceed to the next screen. In a case where it is necessary to change the contents, the "<" button is pressed to return to the previous screen.

In a case where the "To invitation letter send screen" button is pressed, as shown in FIG. 24, a screen for sending an invitation letter to the terminal device 14 of the participating user is displayed on the image display unit 68 of the terminal device 14 of the secretary user by the upload prompting section 44.

On the screen for sending an invitation letter, the secretary user selects, as means for sending an invitation letter, in the example shown in FIG. 24, an SNS message or e-mail, through the instruction input unit 70. The invitation letter is sent to the SNS account of the participating user as an SNS message in a case where an "SNS" button is pressed, and is transmitted to the e-mail address of the participating user by e-mail in a case where an "E-mail" button is pressed.

The secretary user may send the invitation letter to all participating users involved in the creation of a composite image, or may send the invitation letter to only some participating users.

The SNS message or the e-mail includes not only the invitation letter but also images used in a composite image, evaluation information of images, an invitation URL for accessing the screen for each participating user to upload messages for writing or the like, and a common password (in the example shown in FIG. 24, "5865").

In a case where the "Next" button is pressed, the invitation letter is sent to the terminal device 14 of each participating user by the upload prompting section 44 (step S7).

Each participating user receives the invitation letter through the terminal device 14 of the participating user, and accesses a website indicated by the invitation URL through the instruction input unit 70.

Figure 25:
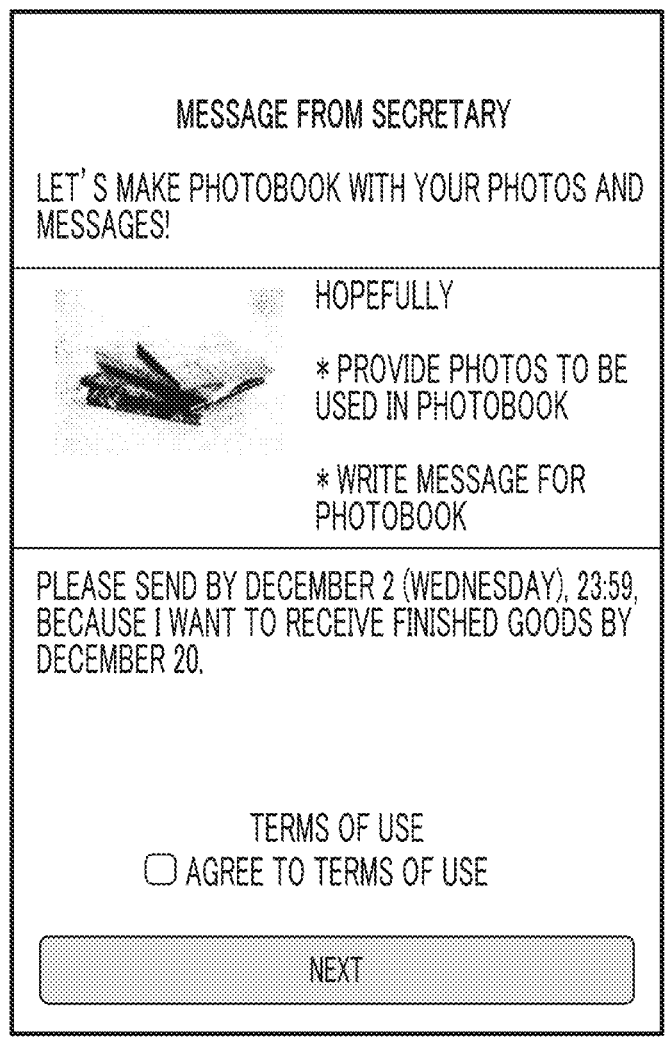
FIG. 25 is a conceptual diagram of an example showing a screen showing the received invitation letter.

In a case where the participating user accesses the website indicated by the invitation URL, as shown in FIG. 25, a screen showing the received invitation letter is displayed on the image display unit 68 of the terminal device 14 of the participating user by the upload prompting section 44 (step S8).

In the invitation letter, in addition to the message from the secretary user, uploading images and messages for writing used in the composite image and information on the deadline (in the case of the present embodiment, 23:59 on Wednesday, December 2) are displayed as a request for participating users.

Each participating user views the screen showing the invitation letter to understand that the request to the participating user from the secretary user is the upload of images and messages for writing to be made as a photobook and that the deadline is December 2.

Figure 26:
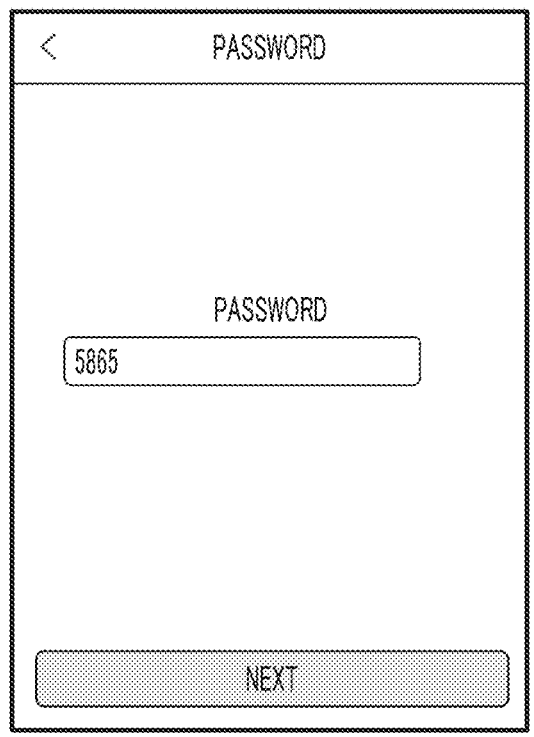

Then, in a case where a check box of "agree with terms and conditions" is checked and the "Next" button is pressed, as shown in FIG. 26, a screen for inputting a common password for accessing a screen for the participating user to upload images used in the composite image, evaluation information of images, messages for writing, and the like is displayed on the image display unit 68 of the terminal device 14 of the participating user by the account information storage section 40.

On the screen for inputting a common password, the participating user inputs the common password included in the received invitation letter (in the example shown in FIG. 26, "5865") through the instruction input unit 70.

Figure 27:
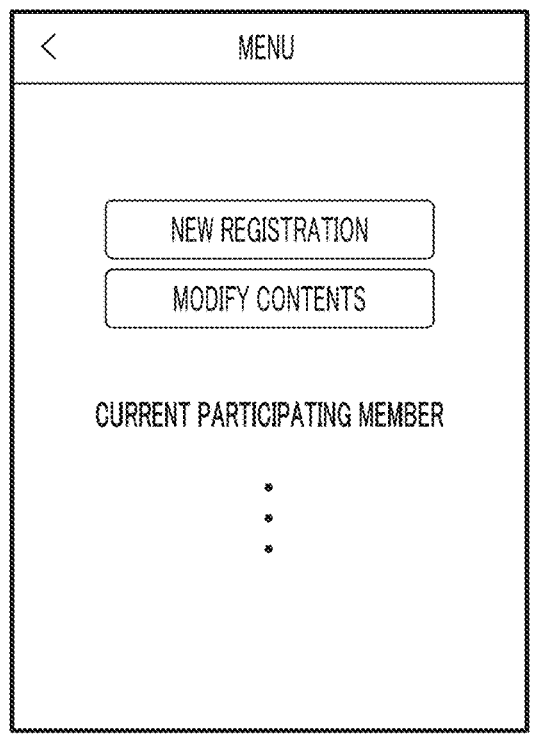
FIG. 27 is a conceptual diagram of an example showing a screen for registering a new participating user.

In a case where the common password is input and the "Next" button is pressed, as shown in FIG. 27, a screen for registering a new participating user is displayed on the image display unit 68 of the terminal device 14 of the participating user by the account information storage section 40.

On the screen for registering a new participating user, the name of a user (current participating member) who is already registered as a participating user is displayed. It is not essential to display the names of registered participating users. However, by displaying the names of registered participating users, in a case where a user registers a participating user newly, the user can register the participating user with confidence in a case where the name that the user knows is included in the names of the registered participating users.

Each participating user presses a "New registration" button in a case where the participating user has not yet been registered in the image processing apparatus 10, and presses a "Modify contents" button in a case where the participating user has already been registered in the image processing apparatus 10.

In a case where the "New registration" button is pressed, as shown in FIG. 28, a screen for registering a name and an individual password (in FIG. 28, displayed as "secret code") to be registered as a participating user is displayed on the image display unit 68 of the terminal device 14 of the participating user by the account information storage section 40.

The participating user inputs a real name or nickname as a name and inputs a certain character string as a secret code through the instruction input unit 70.

The name and the secret code of the participating user are account information of the participating user. As shown in FIG. 27, the participating user can modify images, evaluation information of images, messages for writing, and the like, which have already been uploaded, by pressing the "Modify contents" button on the screen for registering a new participating user and inputting the name and the secret code that have already been registered.

In a case where the name and the secret code of the participating user are input and the "Next" button is pressed, the name and the secret code of the participating user are acquired and are stored as the account information of the participating user by the account information storage section 40.

Then, as shown in FIG. 29, a screen for selecting an image uploaded by the participating user is displayed on the image display unit 68 of the terminal device 14 of the participating user by the image acquisition section 46.

The participating user can select an image to be uploaded by pressing an "Add image" button on the screen for selecting an image to be uploaded. The number of images selected by the participating user is displayed on the screen for selecting an image to be uploaded.

After an image to be uploaded is selected, in a case where the "Next" button is pressed, the image uploaded from the participating user, that is, the image submitted from the terminal device 14 of the participating user is acquired by the image acquisition section 46 (step S9). Thus, the image acquisition section 46 acquires a plurality of images transmitted from the terminal devices 14 of two or more participating users. Each time an image is acquired by the image acquisition section 46, the image is analyzed by the image analysis section 58, and the analysis evaluation value of the image is calculated based on the analysis result of the image by the evaluation value calculation section 60 (step S10).

Figure 30:
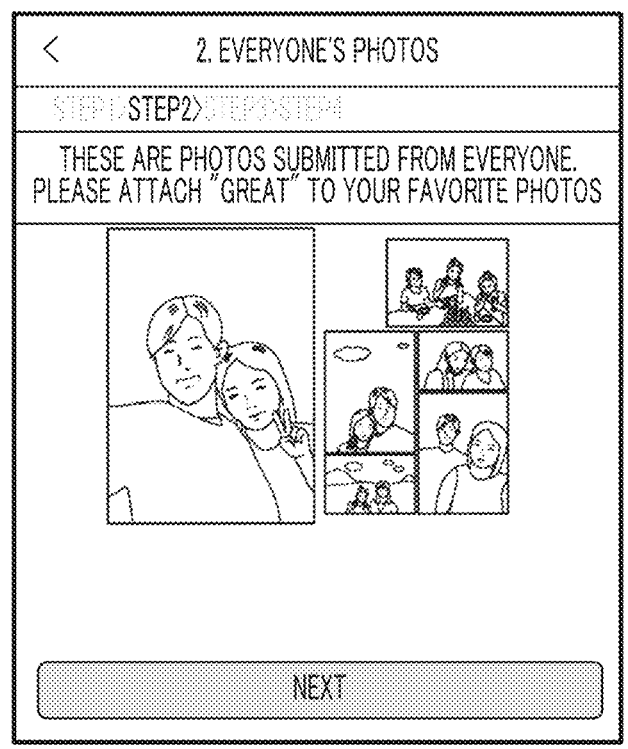
FIG. 30 is a conceptual diagram of an example showing a screen for evaluating each of a plurality of images transmitted from terminal devices of two or more participating users.

Then, as shown in FIG. 30, a screen for evaluating each of the plurality of images transmitted from the terminal devices 14 of two or more participating users is displayed on the image display unit 68 of the terminal device 14 of each participating user by the evaluation information acquisition section 48.

The participating user can give evaluation information indicating high evaluation or low evaluation to each image through the instruction input unit 70 on the screen for evaluating each image. For example, the participating user can view each image, and can give evaluation information indicating high evaluation to an image that the participating user likes by pressing a "Good" button and give evaluation information indicating low evaluation to an image that the participating user dislikes by pressing a "Not good" button.

In a case where evaluation information indicating high evaluation and low evaluation is given to each image from the terminal device 14 of each participating user, the evaluation information indicating high evaluation and low evaluation given to each image is acquired from the terminal device 14 of the participating user by the evaluation information acquisition section 48 (step S11).

Figure 31:
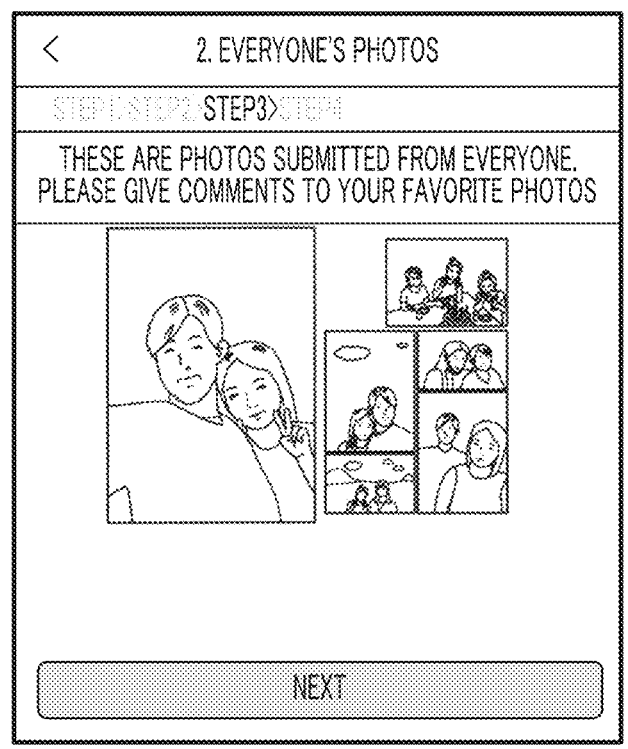
FIG. 31 is a conceptual diagram of an example showing a screen for giving comments to each of a plurality of images transmitted from terminal devices of two or more participating users.

After the evaluation information is given, in a case where the "Next" button is pressed, as shown in FIG. 31, a screen for participating users to give comments to images is displayed on the image display unit 68 of the terminal device 14 of the participating user by the comment acquisition section 72.

The participating user can give comments to each image through the instruction input unit 70 on the screen for giving comments to images.

In a case where comments are given to each image from the terminal device 14 of each participating user, the comments given to each image are acquired from the terminal device 14 of the participating user by the comment acquisition section 72 (step S12).

Figure 32:
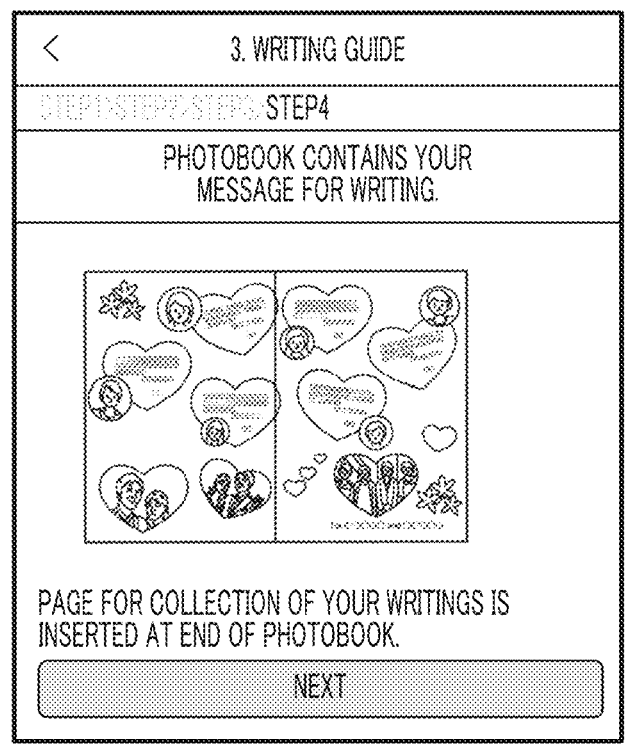
FIG. 32 is a conceptual diagram of an example showing a screen for notifying that a writing page has been inserted at the end of the photobook.

After the comments are given, in a case where the "Next" button is pressed, as shown in FIG. 32, a screen notifying that a writing page has been inserted at the end of the photobook is displayed on the image display unit 68 of the terminal device 14 of the participating user by the message acquisition section 50.

The participating user views and checks the screen notifying that a writing page has been inserted at the end of the photobook.

Figure 33:
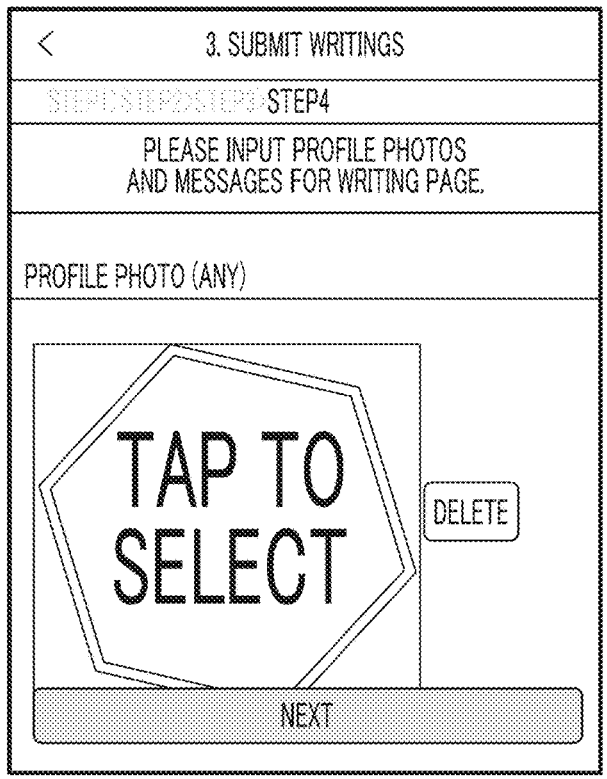
FIG. 33 is a conceptual diagram of an example showing a screen for setting a profile image of a participating user used in a writing page.

Then, in a case where the "Next" button is pressed, as shown in FIG. 33, a screen for setting the profile image of the participating user used in the writing page is displayed on the image display unit 68 of the terminal device 14 of the participating user by the message acquisition section 50.

By pressing the screen for setting a profile image, the participating user can select and set an image used as a profile image, among images owned by the participating user in the terminal device 14 of the participating user. In addition, the participating user can delete the already set profile image by pressing a "Delete" button, and can set the profile image again.

After the participating user has set the profile image, in a case where the "Next" button is pressed, the profile image set by the participating user is acquired from the terminal device 14 of the participating user by the image acquisition section 46 (step S13).

Figure 34:
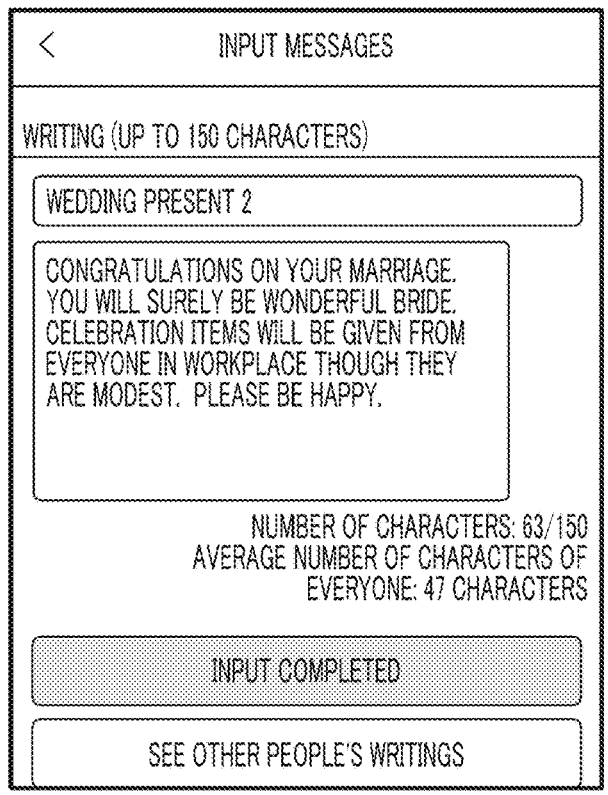
FIG. 34 is a conceptual diagram of an example showing a screen for inputting a message for writing.

Then, as shown in FIG. 34, a screen for inputting a message for writing is displayed on the image display unit 68 of the terminal device 14 of the participating user by the message acquisition section 50.

On the screen for inputting a message for writing, the participating user inputs a message included in the writing page within 150 characters through the instruction input unit 70. In the example shown in FIG. 34, an initial message "Congratulations on your marriage. . . . Please be happy" is automatically input. Therefore, it is possible to save the time and effort for the participating user to input a message. The participating user may use the initial message as it is, or may input other messages.

In addition, each participating user can view messages for writing that other participating users have already uploaded by pressing a "See other people's writings" button on the screen for inputting a message for writing.

Figure 35:
FIG. 35 is a conceptual diagram of an example showing a screen for checking the message for writing input by the participating user.

After the participating user has input the message for writing, in a case where an "Input completed" button is pressed, as shown in FIG. 35, a screen for checking the message for writing input by the participating user is displayed on the image display unit 68 of the terminal device 14 of the participating user by the message acquisition section 50.

On the screen for checking a message for writing, the participating user views and checks a message for writing. In a case where the message is acceptable, a "Submit" button is pressed to proceed to the next screen. In a case where it is necessary to change the message, the "<" button is pressed to return to the previous screen.

In a case where the "Submit" button is pressed, a message for writing submitted by the participating user, that is, a message for writing uploaded from the terminal device 14 of the participating user, is acquired by the message acquisition section 50 (step S14).

Thus, in the case of creating a composite image, such as a photobook, using images of a plurality of users, it is possible to convey the feeling of each participating user to the recipient of the photobook as a message for writing by including not only the main page but also the writing page of the photobook.

Figure 36:
FIG. 36 is a conceptual diagram of an example showing a screen showing that the uploading of the message for writing has been completed.

Then, as shown in FIG. 36, a screen showing that the message for writing has been submitted is displayed on the image display unit 68 of the terminal device 14 of the participating user.

Then, in a case where a "completed" button is pressed, the uploading of images, evaluation information of images, and messages for writing is completed.

Then, in a case where it is detected by the schedule setting section 36 that the deadline for images and messages for writing has passed, the number of images acquired by the image acquisition section 46 is calculated by the number-of-images calculation section 52 (step S15). In addition, the number of pieces of evaluation information indicating high evaluation and low evaluation given to each image, which have been acquired by the evaluation information acquisition section 48, is calculated by the number-of-evaluations calculation section 54 (step S16). The number of comments given to each image, which have been acquired by the comment acquisition section 72, is calculated by the number-of-comments calculation section 76 (step S17). The number of messages for writing acquired by the message acquisition section 50 is calculated by the number-of-messages calculation section 56 (step S18).

Then, based on the evaluation information indicating high evaluation and low evaluation for each image (for example, the number of pieces of evaluation information) and comments given to each image (for example, the number of comments), the evaluation value calculation section 60 adds or subtracts a value to or from the analysis evaluation value of each image to calculate the overall evaluation value of each image (step S19).

For example, the evaluation value calculation section 60 calculates the overall evaluation value of each image by adding a larger value to the analysis evaluation value of each image as the number of pieces of evaluation information indicating high evaluation given to each image becomes larger and as the number of comments given to the image becomes larger. In addition, the evaluation value calculation section 60 calculates the overall evaluation value of each image by subtracting a larger value from the analysis evaluation value of each image as the number of pieces of evaluation information indicating low evaluation given to each image becomes larger.

As described above, it is not essential to analyze an image and calculate the analysis evaluation value each time an image is acquired. However, by analyzing an image and calculating the analysis evaluation value each time an image is acquired, it is possible to calculate the overall evaluation value of an image in a short period of time compared with a case where all images are acquired and then the images are collectively analyzed to calculate the analysis evaluation value. As a result, it is possible to shorten the time taken to create a composite image.

Then, the secretary user instructs the composite image creation unit 26 to create a composite image through the instruction input unit 70 in the terminal device 14 of the secretary user.

In a case where the composite image creation unit 26 is instructed to create a composite image, the cover creation section 62 creates a cover page which is a design corresponding to the information of the design of the cover page, on which the title set by the secretary user is written, and which has a color set by the secretary user (step S20).

Then, the main part creation section 64 creates a main page of the photobook using at least one image among the plurality of images acquired by the image acquisition section 46 (step S21).

In the main part creation section 64, the image division section 78 divides the plurality of images acquired by the image acquisition section 46 into a plurality of groups corresponding to the number of main pages.

Then, for each group of images, based on the overall evaluation value of each image, the image extraction section 80 extracts a plurality of images used in the main pages, among the images included in the group, as compositing target images in order from the image with the highest overall evaluation value.

In the case of the present embodiment, it is assumed that two or more compositing target images including one or more first images to which comments are given are extracted from images included in a group.

Then, for each group of images, the image arrangement section 82 determines the size of each compositing target image and the arrangement position in the main page, as the first layout, based on the overall evaluation value of each image, and arranges the compositing target image on the corresponding main page in the first layout, thereby creating the main page. For example, a compositing target image with the highest overall evaluation value, among a plurality of compositing target images arranged in the main page, is arranged at the center position of the page with a size larger the other compositing target images.

Then, the comment combination region presence determination section 84 determines whether or not a region where comments given to the first image are to be combined is present around a compositing target image in the arrangement region of compositing target images in the main page created by the image arrangement section 82.

Here, in a case where the comment combination region presence determination section 84 determines that a region where comments given to the first image are to be combined is present around the compositing target image, the first layout is not changed by the composite image layout change section 86.

On the other hand, in a case where the comment combination region presence determination section 84 determines that a region where comments given to the first image are to be combined is not present around the compositing target image, that is, in a case where the comments cannot be arranged around the compositing target image, the composite image layout change section 86 changes the first layout determined by the image arrangement section 82 to the second layout for combining the compositing target image with the comments given to the first image.

Here, in an album product, such as a photobook, a region where images can be arranged on a main page of one page is limited. Accordingly, it is desired to effectively use the arrangement region. In addition, images corresponding to events or the like are arranged all together on each two-page spread page of the main page. For this reason, in order to arrange comments, there is also a problem that it is not possible to simply move images other than the first image to a page on the back side in a ball-and-play manner, for example.

Therefore, in the case of the present embodiment, the composite image layout change section 86 changes the first layout to the second layout by performing at least one of (1) to (4).

(1) Arrange the comments given to the first image in the arrangement region of compositing target images in the main page obtained by reducing the sizes of one or more images other than the first image among the compositing target images.

(2) Arrange the comments given to the first image in the arrangement region of compositing target images in the main page obtained by deleting one or more images other than the first image among the compositing target images.

(3) Make the arrangement region of comments translucent, and arrange one of the compositing target images and the comments given to the first image so as to be superimposed on each other.

(4) Extract the background region of one of the compositing target images, and arrange the comments given to the first image in the background region of one of the compositing target images.

That is, in the case of performing (1) or (2) in the second layout, the sizes and the number of images other than the first image among the compositing target images in the first layout are changed. In addition, in the case of performing (3) or (4) in the second layout, the sizes, the number, and the arrangement positions of compositing target images in the first layout are not changed, but changes are made such that the comments are not arranged around the compositing target image but arranged so as to be superimposed on the compositing target image.

In the case of performing (1) or (2) in the second layout, the comments given to the first image may be arranged near the first image (within a predetermined range from the first image), or may be arranged away from the first image (outside the predetermined range from the first image). In addition, the size of an image adjacent to the first image among the compositing target images may be reduced or deleted, or the size of an image may be reduced or deleted sequentially from an image having the lowest overall evaluation value among the compositing target images.

In the case of performing (3) or (4) in the second layout, the first image and the comments given to the first image may be arranged so as to be superimposed on each other, or an image other than the first image and the comments given to the first image may be arranged so as to be superimposed on each other.

Translucent refers to, for example, a case where the transparency of the pixel value of the comment arrangement region in the compositing target image is in the range of 25% to 75% and corresponding to this, the transparency of the pixel value of the comments is in the range of 75% to 25%. A case where the second layout is (4) can be considered that the comments are combined with the background region of the compositing target image with the transparency of the comment arrangement region in the compositing target image as 0% in the case where the second layout is (3).

Hereinafter, specific examples of changing the first layout to the second layout will be described.

Example 1

A case is considered in which the number of compositing target images arranged in the main page, the size and the arrangement position of each compositing target image, and the number, sizes, and arrangement positions of comments are determined in the first layout. As the comment arrangement region, it is assumed that a predetermined number of comment arrangement regions are provided in advance for each compositing target image, for example, two comment arrangement regions are provided around each compositing target image.

In this case, for example, in a case where the total number of comments given to the first image included in the main page exceeds the total number of comment arrangement regions determined by the first layout, the comment combination region presence determination section 84 determines that a region where the comments given to the first image are to be combined is not present around the compositing target image in the arrangement region of compositing target images in the main page.

In response to this, the composite image layout change section 86 changes the first layout to the second layout in which the sizes and the number of images other than the first image among the compositing target images are changed as in (1) and (2). Alternatively, by changing the transparency of the comment arrangement region (superposition region) in the compositing target image as in (3) and (4), the first layout is changed to the second layout such that the comments are arranged so as to be superimposed in the arrangement region of compositing target images or the comments are arranged so as to be superimposed in the background region of compositing target images.

The image arrangement section 82 creates the main page by arranging comments at the comment arrangement position determined by the first layout and the new comment arrangement position determined in the second layout.

Example 2

In the first layout, a case is considered in which only the number, sizes, and arrangement positions of compositing target images are determined and the comment arrangement region is not determined.

In this case, for example, the image arrangement section 82 arranges comments one by one around the compositing target image, and the comment combination region presence determination section 84 dynamically determines whether or not a comment arrangement region is present each time one comment is arranged. Then, in a case where it is not possible to arrange comments, the comment combination region presence determination section 84 determines that a region where comments given to the first image are to be combined is not present around the compositing target image in the arrangement region of compositing target images in the main page.

In response to this, the composite image layout change section 86 changes the first layout to the second layout in which at least one of (1) to (4) is performed as in the case of Example 1.

The image arrangement section 82 creates the main page by arranging comments at the new comment arrangement position determined in the second layout in addition to the comments already arranged in the first layout.

For example, the composite image layout change section 86 may change the first layout to the second layout in which at least one set in advance among (1) to (4) is performed, or may change the first layout to the second layout in which at least one designated by the secretary user among (1) to (4) is performed. In addition, according to the number of comments given to the first image included in the compositing target image, the first layout can also be changed to the second layout in which at least one of (1) to (4) is performed.

In a case where the first layout is changed to the second layout by the composite image layout change section 86, the image arrangement section 82 arranges the compositing target image in the second layout and combines the compositing target image and the comments given to the first image to recreate the main page. In this manner, in the main page, it is possible to combine the compositing target image with the comments given to the first image by a plurality of participating users.

As described above, in the image processing apparatus 10, it is possible to create a main page by acquiring a plurality of images from a plurality of participating users, acquiring comments given to each of the plurality of images by the plurality of participating users, and combining compositing target images with comments given to the first image by the plurality of participating users. In addition, it is possible to arrange a larger number of comments in the arrangement region of compositing target images in the composite image without losing the value of the first image in the main page.

Here, the image arrangement section 82 may emphasize the first image, which is an image to which comments are given, so as to be more noticeable than the second image, which is an image to which no comment is given, in the main page. For example, the image arrangement section 82 can increase the size of the first image so as to be larger than the size of the second image, or can arrange a frame image decorating the periphery of the image only around the first image without arranging the frame image around the second image.

In a case where at least one of (1) or (2) is performed in the second layout and a plurality of comments are given to one first image, it is desirable that the image arrangement section 82 arranges the plurality of comments given to one first image side by side around the first image, for example, in at least one of the upper, lower, right, and left positions of the one first image in the arrangement region of compositing target images in the main page.

In the case of arranging a plurality of comments side by side, the image arrangement section 82 may arrange face images of participating users, by whom the plurality of comments have been given to the first image, in the arrangement region of compositing target images in the main page so as to be associated with each comment given to the first image.

In this case, it is necessary to acquire the face image of each participating user from the terminal device 14 of each participating user. In the case of the present embodiment, however, since the image acquisition section 46 acquires the profile image of the participating user set by each participating user, the profile image of each participating user can be used as a face image. Alternatively, the image acquisition section 46 may separately acquire the face image of each participating user from the terminal device 14 of each participating user.

The image arrangement section 82 may display the name of a participating user, by whom each of a plurality of comments has been given to the first image, in the arrangement region of compositing target images in the main page so as to be associated with each comment given to the first image.

Similarly, it is necessary to acquire the name of each participating user from the terminal device 14 of each participating user. In the case of the present embodiment, however, since the account information storage section 40 stores the name and individual password of each participating user as account information of the participating user, the name of the participating user stored as the account information of the participating user can be used as the name of the participating user.

The image arrangement section 82 may arrange the comment given to the first image in the arrangement region of compositing target images in the main page obtained by reducing the size of the first image. In this case, although the size of the first image is reduced, comments given to that first image can be reliably arranged around the first image in the arrangement region of compositing target images in the main page.

On the other hand, in a case where (3) or (4) is performed in the second layout, the image arrangement section 82 may display the comments given to the first image in the form of a balloon within the arrangement region of the first image.

The comment acquisition section 72 may acquire additional comments, which are given to the comments given to the first image, from the terminal devices 14 of the plurality of participating users through the network 16. In this case, in a case where at least one of the above-described (1) or (2) is performed in the second layout, the image arrangement section 82 arranges the comments and the additional comments given to the first image side by side around the first image in the arrangement region of compositing target images in the main page.

The secretary user can designate an image (third image) among a plurality of images during a predetermined period for acquiring images or even after a predetermined period of time has passed and request participating users to give comments to the third image.

In this case, in a case where the third image is designated by the secretary user, the comment request section 74 requests the terminal devices 14 of the plurality of participating users to give comments to the third image designated by the secretary user. Then, in a case where comments are given to the third image by each participating user, the comments given to the third image are acquired from the terminal device 14 of the participating user by the comment acquisition section 72.

For example, the comment acquisition section 72 may acquire comments, which are given to the third image by a plurality of participating users, from the terminal devices 14 of the plurality of participating users for a predetermined period during which a comment request is made by the comment request section 74, or may end the acquisition of comments at a point in time at which the number of comments given to the third image reaches a predetermined number.

The image arrangement section 82 may change the color of characters included in the comments given to the first image or the color of the boundary of the characters based on the analysis result of the first image. For example, according to the color of the first image, the color of characters included in the comments given to the first image or the color of the boundary of the characters may be changed. The image arrangement section 82 may change the characters included in the comments in a three-dimensional manner. As a result, the comments can be emphasized so as to be noticeably displayed.

It is desirable to combine all comments given to the first image in the arrangement region of compositing target images in the main page. However, in a case where a plurality of comments are given to one first image, it may be difficult to combine all the comments.

In this case, the comment selection section 88 may select a smaller number of comments than a plurality of comments given to the one first image, among the plurality of comments given to the one first image, as selected comments.

For example, in a case where the number of comments given to the first image exceeds a threshold value, the comment selection section 88 can select comments, the number of which is equal to or less than the threshold value selected by the secretary user, among the plurality of comments given to the first image, as selected comments.

In a case where the selected comments are selected by the comment selection section 88, the image arrangement section 82 arranges a compositing target image and combines the compositing target image and the selected comments given to the first image to create the main page.

Then, the writing creation section 66 creates a writing page of the design corresponding to the information of the design of the writing page by using the profile images and messages for writing of participating users (step S22).

In the writing creation section 66, the message division section divides the messages for writing acquired by the message acquisition section 50 into groups, the number of which corresponds to the number of writing pages.

Then, for each group of messages for writing, for example, the message arrangement section combines messages for writing included in a group with the profile image of the corresponding participating user, and arranges a result of the combination on the writing page of a page corresponding to the group of messages for writing. Thus, a writing page is created. In each writing page, messages for writing are sequentially arranged, for example, in order in which messages for writing are uploaded.

As described above, using a plurality of images, profile images of participating users, and messages for writing that have been acquired from the terminal devices 14 of two or more participating users, a photobook including a cover page corresponding to the information of the design of the cover page, main pages, and writing pages corresponding to the information of the design of the writing pages is automatically created by the cover creation section 62, the main part creation section 64, and the writing creation section 66.

In the image processing apparatus 10, it is possible to create a composite image, such as a photobook including not only the main page but also the writing page. In addition, it is possible to create a composite image reflecting not only the image quality but also the preferences of a plurality of participating users by determining not only images used in the main page but also the size of each image and the arrangement position in the main page based on the overall evaluation value of each image.

The secretary user views each page of the photobook, which includes the cover page, the main page, and the writing page that have been automatically created, in the terminal device 14 of the secretary user. The secretary user may adopt the photobook created automatically as it is, or may edit the contents of each page, for example, images used in each page, the size of each image, and the arrangement positions of images and messages for writing. In addition, it is possible to add comments, add a stamp image, and change the background type and color of each page.

The secretary user completes the creation of the photobook during the composite image creation period set by the schedule setting section 36, in the case of the present embodiment, by December 4, and orders an image product with the contents of the photobook that has been created (step S23). The image product ordered by the secretary user includes at least one of a photobook of a paper medium or a photobook of electronic data.

In a case where the image product is ordered, the photobook of the ordered image product is created and is sent to the delivery address by the delivery date of the image product set by the schedule setting section 36, in the case of the present embodiment, by December 20 (step S24). In the case of a photobook of a paper medium, for example, the photobook of a paper medium is transmitted to the delivery address. In the case of a photobook of electronic data, for example, the photobook of electronic data or an URL for downloading electronic data is transmitted to the e-mail address of the delivery address.

As described above, in the image processing apparatus 10, it is possible to create a composite image, such as a photobook including a writing page, using a plurality of images and messages for writing acquired from the terminal devices 14 of a plurality of participating users.

It is not essential for only the secretary user to create a composite image, and a plurality of users involved in the creation of a composite image may create a composite image together with each other, or at least one user (first user of the present invention) of a plurality of users may create a composite image.

The specific configuration of each unit of the image processing apparatus 10 is not limited at all, and it is possible to use various configurations capable of performing the same functions. In the embodiment described above, the server 12 includes the information setting unit 18, the information management unit 20, the data acquisition unit 22, the data analysis unit 24, and the composite image creation unit 26, but at least one of these may be provided in the terminal device 14 of the user.

In the apparatus according to the embodiment of the present invention, each component of the apparatus may be formed using dedicated hardware, or each component may be formed using a programmed computer.

The method according to the embodiment of the present invention can be realized, for example, by a program causing a computer to execute each step of the method. In addition, it is also possible to provide a computer-readable recording medium in which the program is recorded.

While the present invention has been described in detail, the present invention is not limited to the above-described embodiment, and various improvements and modifications may be made without departing from the scope and spirit of the present invention.

EXPLANATION OF REFERENCES

10: image processing apparatus
12: server
14: terminal device (client)
16: network
18: information setting unit
20: information management unit
22: data acquisition unit
24: data analysis unit
26: composite image creation unit
28: budget setting section
30: product item acquisition section
32: cover design setting section
34: writing design setting section
36: schedule setting section
38: setting storage section
40: account information storage section
42: management screen information transmission section
44: upload prompting section
46: image acquisition section
48: evaluation information acquisition section
50: message acquisition section
52: number-of-images calculation section
54: number-of-evaluations calculation section
56: number-of-messages calculation section
58: image analysis section
60: evaluation value calculation section
62: cover creation section
64: main part creation section
66: writing creation section
68: image display unit
70: instruction input unit
72: comment acquisition section
74: comment request section
76: number-of-comments calculation section
78: image division section
80: image extraction section
82: image arrangement section
84: comment combination region presence determination section
86: composite image layout change section
88: comment selection section

What is claimed is:

1. An image processing apparatus, comprising:
a processor configured to,
   acquire a plurality of images from a plurality of users,
   acquire comments, which are given to each of the plurality of images by the plurality of users, from the plurality of users,
   extract two or more images including one or more first images that are images to which the comments are given, among the plurality of images, as compositing target images,
   arrange the compositing target images according to a first layout to create a composite image,
   determine whether or not a first region where the comments given to the first images are to be combined is present around the compositing target images in the composite image of the first layout,
   in a case where the first region is not present around the compositing target images, change the first layout to a second layout, in which the compositing target images and the comments given to the first images are combined,
   in the case where the first region is not present around the compositing target images, arrange the compositing target images in the second layout and combine the compositing target images and the comments given to the first images to recreate the composite image, and
   in a case where the first region is present around the compositing target images, combine the compositing target images and the comments given to the first images in the first layout.

2. The image processing apparatus according to claim 1, wherein the processor is further configured to change the first layout to the second layout by performing at least one of (1) arranging the comments given to the first images in a region obtained by reducing the sizes of one or more images other than the first images among the compositing target images, (2) arranging the comments given to the first images in a region obtained by deleting one or more images other than the first images among the compositing target images, (3) making the first region translucent and arranging one of the compositing target images and the comments given to the first images so as to be superimposed on each other, or (4) extracting a background region of one of the compositing target images and arranging the comments given to the first images in the background region of one of the compositing target images.

3. The image processing apparatus according to claim 2, wherein the processor is further configured to,
   calculate the number of comments given to each of the images, and
   change the first layout to the second layout, in which at least one of the (1) to (4) is performed, according to the number of comments given to the first images included in the compositing target images.

4. The image processing apparatus according to claim 2, wherein, in a case where at least one of the (1) or the (2) is performed in the second layout and a plurality of comments are given to the one first image, the processor is further configured to arrange the plurality of comments given to the one first image side by side around the one first image in the composite image.

5. The image processing apparatus according to claim 4, wherein the processor is further configured to,
   acquire a face image of each of the users from each of the users, and
   arrange face images of users, who have given the plurality of comments to the first images, so as to be associated with the respective comments given to the first images in the composite image.

6. The image processing apparatus according to claim 4, wherein the processor is further configured to display names of users, who have given the plurality of comments to the first images, so as to be associated with the respective comments given to the first images in the composite image.

7. The image processing apparatus according to claim 4, wherein the processor is further configured to arrange the comments given to the first images in a region obtained by reducing the sizes of the first images.

8. The image processing apparatus according to claim 2, wherein, in a case where at least one of the (3) or the (4) is performed in the second layout, the processor is further configured to display the comments given to the first images in a form of a balloon within an arrangement region of the first images.

9. The image processing apparatus according to claim 2, wherein the processor is further configured to,
   acquire additional comments, which are given to the comments given to the first images, from the plurality of users, and
   in a case where at least one of the (1) or the (2) is performed in the second layout, arrange the comments given to the first images and the additional comments side by side around the first images in the composite image.

10. The image processing apparatus according to claim 1, wherein the processor is further configured to,
    analyze contents of each of the images,
    calculate an analysis evaluation value of each of the images based on an analysis result of each of the images,
    calculate the number of comments given to each of the images,
    calculate an overall evaluation value of each of the images by adding a larger value to the analysis evaluation value of each of the images as the number of comments becomes larger, and
    extract the compositing target images among the plurality of images based on the overall evaluation value.

11. The image processing apparatus according to claim 10,
    wherein the processor is further configured to,
    acquire evaluation information, which indicates user's evaluation for each of the images, from the plurality of users,
    calculate the number of pieces of evaluation information, which indicates a high evaluation of the user's evaluation, given to each of the images, and
    calculate the overall evaluation value of each of the images by adding a larger value to the analysis evaluation value of each of the images as the number of pieces of evaluation information indicating the high evaluation of the user's evaluation becomes larger.

12. The image processing apparatus according to claim 11,
    wherein the processor is further configured to arrange a frame image decorating periphery of an image only around the first image.

13. The image processing apparatus according to claim 1, wherein the processor is further configured to emphasize the first images so as to be more noticeable than a second image that is an image to which the comments are not given.

14. The image processing apparatus according to claim 13,
    wherein the processor is further configured to increase the size of the first image so as to be larger than a size of the second image.

15. The image processing apparatus according to claim 1, wherein the processor is further configured to,
    request the plurality of users to send comments on a third image, which is an image designated by at least one first user of the plurality of users, among the plurality of images, and
    acquire comments given to the third image.

16. The image processing apparatus according to claim 1, wherein the processor is further configured to change a color of characters included in the comments given to the first images or a color of a boundary of the characters based on an analysis result of each of the first images.

17. The image processing apparatus according to claim 1, wherein the processor is further configured to change the characters included in the comments given to the first images in a three-dimensional manner.

18. The image processing apparatus according to claim 1, wherein the processor is further configured to,
    select a smaller number of comments than a plurality of comments given to the one first image, among the plurality of comments given to the one first image, as selected comments in a case where the plurality of comments are given to the one first image, and arrange the compositing target images and combine the compositing target images and the selected comments to create the composite image.

19. The image processing apparatus according to claim 1, wherein the processor is further configured to determine whether or not the first region is present around the compositing target images in a region other than an arrangement region arranged the compositing target images in the composite image of the first layout.

20. The image processing apparatus according to claim 19, wherein the processor is further configured to composite the comments given to the first images in the composite image of the second layout are combined in a region included at least part of an arrangement region of the compositing target images in the composite image of the first layout, in a case where the first region is not present around the compositing target images.

21. The image processing apparatus according to claim 1, wherein the processor is further configured to determine that the first region is not present around the compositing target images, in a case where a total number of comments given to the first image exceeds a total number of comment arrangement regions determined by the first layout.

22. An image processing method, comprising:
acquiring a plurality of images from a plurality of users;
acquiring comments, which are given to each of the plurality of images by the plurality of users, from the plurality of users;
extracting two or more images including one or more first images that are images to which the comments are given, among the plurality of images, as compositing target images;
arranging the compositing target images according to a first layout to create a composite image;
determining whether or not a first region where the comments given to the first images are to be combined is present around the compositing target images in the composite image of the first layout;
in a case where the first region is not present around the compositing target images, changing the first layout to a second layout, in which the compositing target images and the comments given to the first images are combined;
in the case where the first region is not present around the compositing target images, arranging the compositing target images in the second layout and combining the compositing target images and the comments given to the first images to recreate the composite image; and
in a case where the first region is present around the compositing target images, combining the compositing target images and the comments given to the first images in the first layout.

23. The image processing method according to claim 22, wherein, in a case of changing the first layout to the second layout, the first layout is changed to the second layout by performing at least one of (1) arranging the comments given to the first images in a region obtained by reducing the sizes of one or more images other than the first images among the compositing target images, (2) arranging the comments given to the first images in a region obtained by deleting one or more images other than the first images among the compositing target images, (3) making the first region of the comments translucent and arranging one of the compositing target images and the comments given to the first images so as to be superimposed on each other, or (4) extracting a background region of one of the compositing target images and arranging the comments given to the first images in the background region of one of the compositing target images.

24. A non-transitory computer-readable recording medium in which a program causing a computer to execute each step of the image processing method according to claim 22 is recorded.

* * * * *